`US010664939B2`

United States Patent
Hazeyama

(10) Patent No.: US 10,664,939 B2
(45) Date of Patent: May 26, 2020

(54) POSITION CONTROL SYSTEM, POSITION DETECTION DEVICE, AND NON-TRANSITORY RECORDING MEDIUM

(71) Applicant: OMRON Corporation, Kyoto (JP)

(72) Inventor: Hiroyuki Hazeyama, Otsu (JP)

(73) Assignee: OMRON Corporation, Kyoto (JP)

( * ) Notice: Subject to any disclaimer, the term of this patent is extended or adjusted under 35 U.S.C. 154(b) by 179 days.

(21) Appl. No.: 15/892,360

(22) Filed: Feb. 8, 2018

(65) Prior Publication Data
US 2019/0005600 A1    Jan. 3, 2019

(30) Foreign Application Priority Data
Jun. 30, 2017   (JP) .................. 2017-128749

(51) Int. Cl.
*G06T 1/00*       (2006.01)
*G06T 7/73*       (2017.01)
*G06T 7/70*       (2017.01)
*B23Q 3/18*       (2006.01)

(52) U.S. Cl.
CPC .............. *G06T 1/0014* (2013.01); *B23Q 3/18* (2013.01); *G06T 7/70* (2017.01); *G06T 7/73* (2017.01); *G06T 2207/30108* (2013.01); *G06T 2207/30164* (2013.01)

(58) Field of Classification Search
None
See application file for complete search history.

(56) References Cited

U.S. PATENT DOCUMENTS

| 6,718,057 | B1 * | 4/2004 | Mori ........................ G06T 7/73 250/491.1 |
| RE44,353 | E * | 7/2013 | Mirtich ................... G06F 9/451 382/100 |
| 2001/0048759 | A1 * | 12/2001 | Hiramoto .............. G06T 7/0002 382/141 |
| 2008/0212057 | A1 * | 9/2008 | Van Haren ............ G03F 9/7076 355/53 |

FOREIGN PATENT DOCUMENTS

JP       2006214816 A  *  8/2006
JP       2014203365        10/2014

* cited by examiner

*Primary Examiner* — Vu Le
*Assistant Examiner* — Tracy Mangialaschi
(74) *Attorney, Agent, or Firm* — JCIPRNET

(57) ABSTRACT

A position control system 1 acquires image data obtained by imaging a workpiece, detects a position of the workpiece on the basis of the image data by first detection processing, outputs a control command for controlling the position of the workpiece in a case in which the position of the workpiece has been detected, detects the position of the workpiece on the basis of the image data in accordance with second detection processing that is more robust than first detection processing in a case in which the position of the workpiece has not been detected, and outputs a control command for controlling the position of the workpiece on the basis of a result of the detection in the second detection processing.

17 Claims, 16 Drawing Sheets

| Candi-date | algorithm | | | | | parameter setting value | result of evaluation | |
|---|---|---|---|---|---|---|---|---|
| | measurement algorithm | | additional processing | | | search region | deviation from manually input coordinates (pix) | processing time (ms) |
| | search detection processing | edge detection processing | | filter processing | size variation processing | | | |
| 1 | effective | ineffective | | ineffective | ineffective | (0,0)–(640,480) | 0 | 50 |
| 2 | effective | ineffective | | ineffective | ineffective | (100,100)–(540,380) | 5 | 40 |
| 3 | effective | ineffective | | ineffective | ineffective | (200,200)–(440,280) | 10 | 30 |
| 4 | effective | ineffective | | ineffective | effective | (0,0)–(640,480) | 10 | 110 |
| 5 | effective | ineffective | | ineffective | effective | (100,100)–(540,380) | 0 | 100 |
| 6 | effective | ineffective | | ineffective | effective | (200,200)–(440,280) | 0 | 90 |

FIG. 11

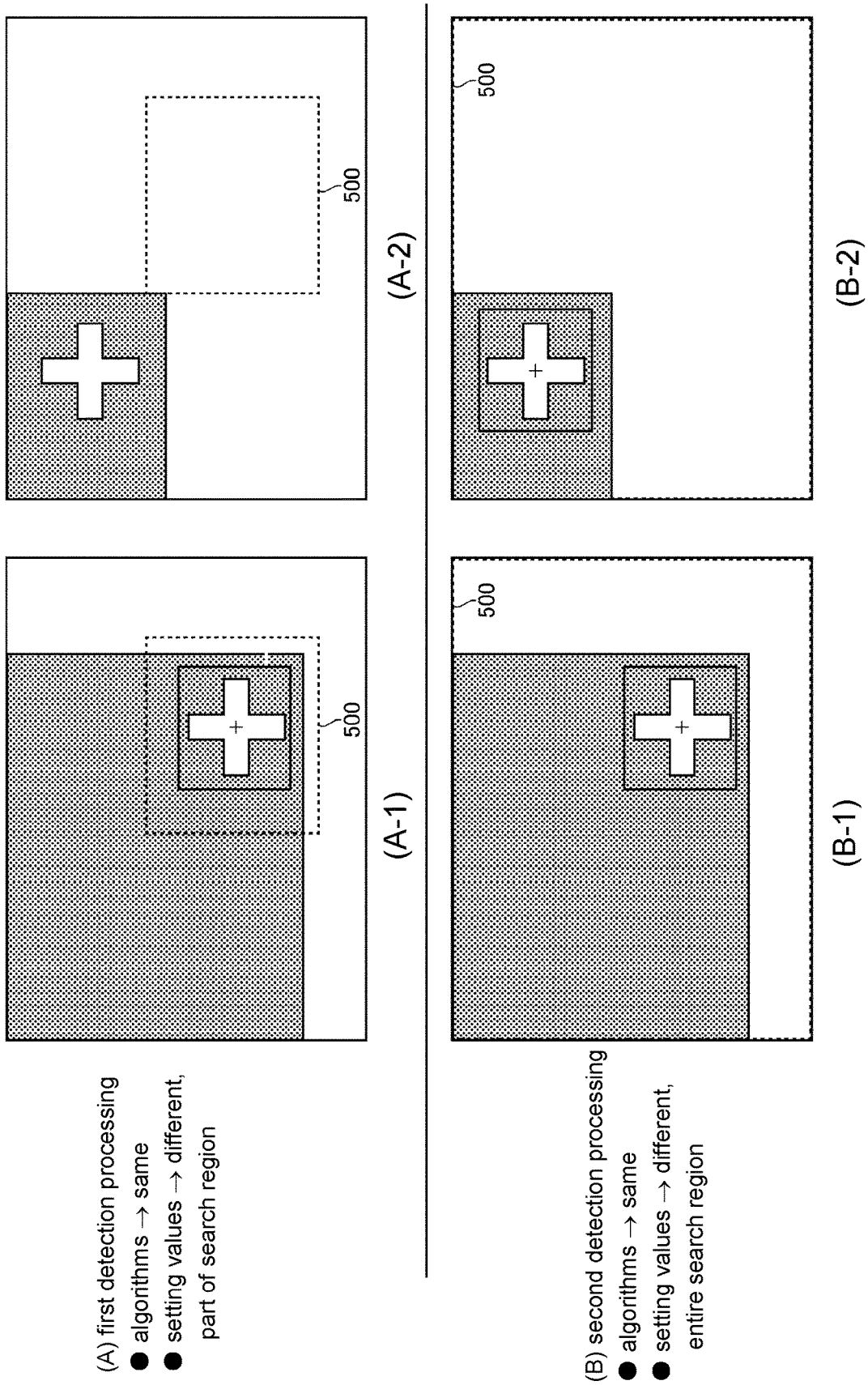

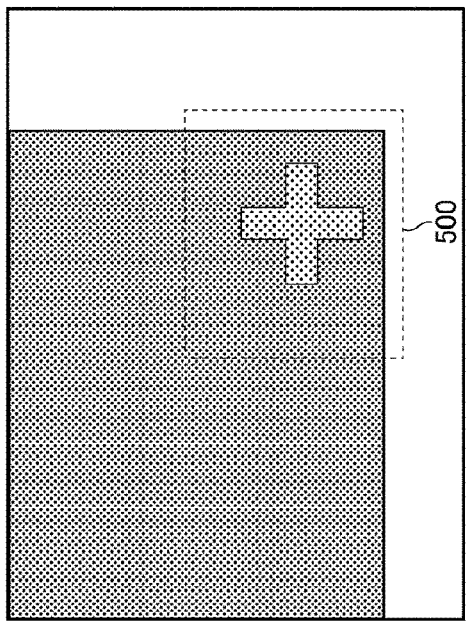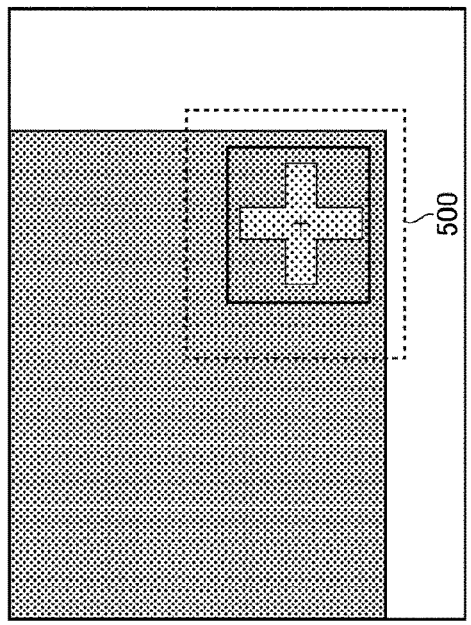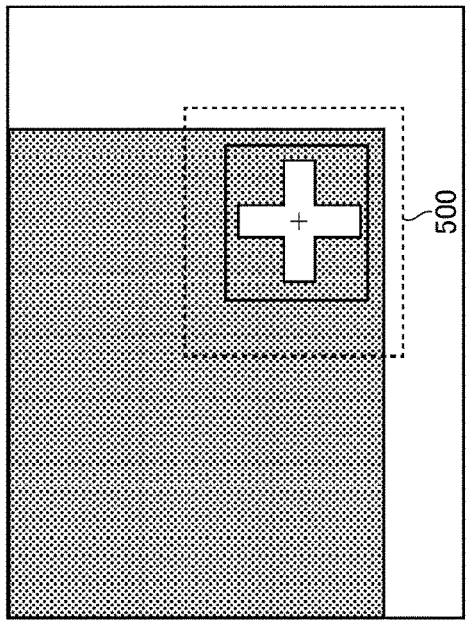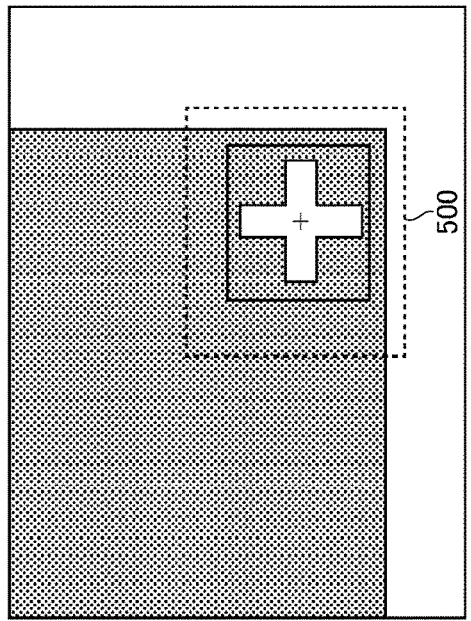
FIG. 13
(A-1) (A-2)
(A) first detection processing
- algorithms → different, filter processing is set to be ineffective
- setting values → same
(B-1) (B-2)
(B) second detection processing
- algorithms → different, filter processing is set to be effective
- setting values → same

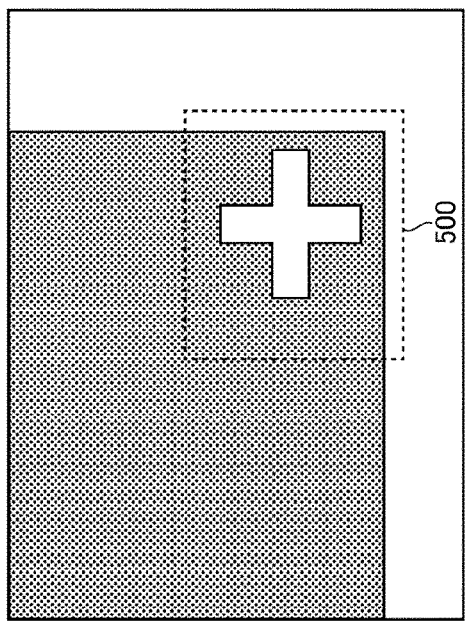
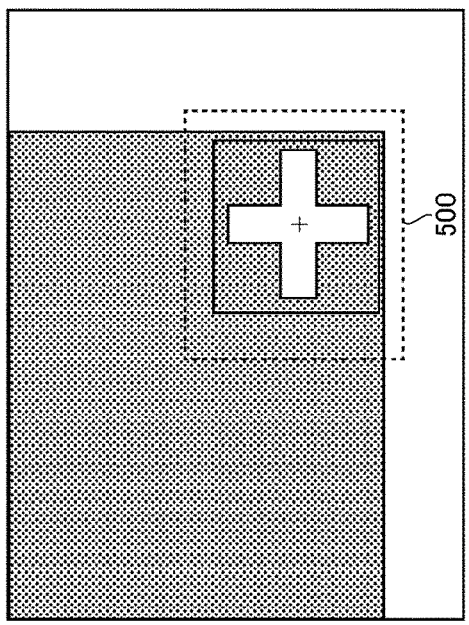
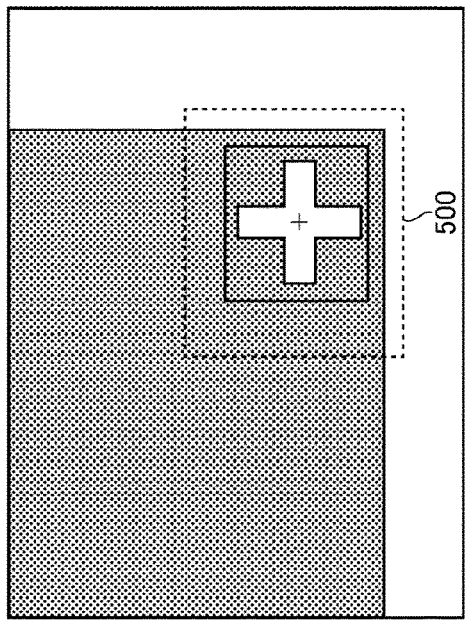
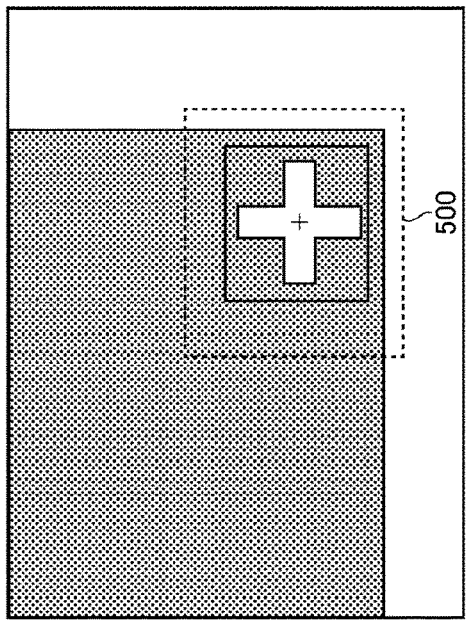
(A-1)  (A-2)
(B-1)  (B-2)
(A) first detection processing
- algorithms → different, size variation is set to be ineffective
- setting values → same
(B) second detection processing
- algorithms → different, size variation is set to be effective
- setting values → same
FIG. 14

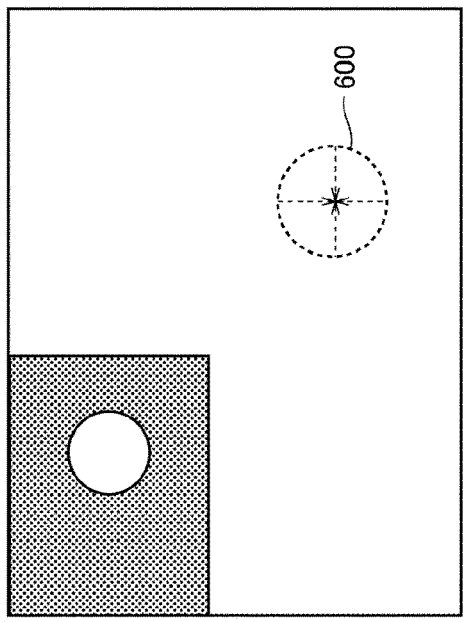
(A) first detection processing
● algorithms → different, edge detection processing
● setting values → different, for edge detection processing
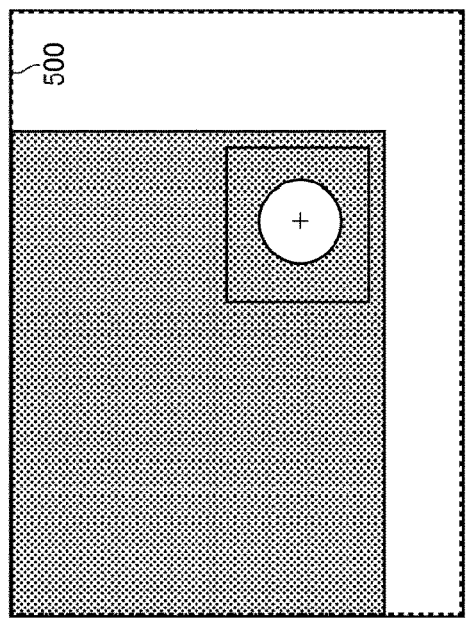
(B) second detection processing
● algorithms → different, search detection processing
● setting values → different, for search detection processing
FIG. 15

POSITION CONTROL SYSTEM, POSITION DETECTION DEVICE, AND NON-TRANSITORY RECORDING MEDIUM

CROSS-REFERENCE TO RELATED APPLICATION

This application claims the priority of Japan patent application serial no. 2017-128749, filed on Jun. 30, 2017. The entirety of the above-mentioned patent application is hereby incorporated by reference herein and made a part of this specification.

BACKGROUND

Technical Field

The disclosure relates to a position control system that controls a position of an object that is moved by a moving mechanism, a position detection device that detects a position of an object that is moved by a moving mechanism, and a control program that realizes the position detection device.

Description of Related Art

In a related art, processing of detecting a position of an object (hereinafter, also referred to as a "workpiece") on the basis of image data that is acquired by imaging the workpiece and arranging the workpiece at an original position on the basis of detected position data has been performed in the field of factory automation (FA) and the like.

For example, Japanese Unexamined Patent Application Publication No. 2014-203365 (Patent Document 1) discloses a processing device that images a positioning mark of a workpiece arranged on a stage, detects the position of the workpiece on the basis of the image data, and outputs a command on the basis of detected position data of the workpiece to a controller that controls the stage.

[Patent Document 1] Japanese Unexamined Patent Application Publication No. 2014-203365

In a production line in which the aforementioned processing device in the related art is used, there are cases in which the position detection of the workpiece fails and the workpiece for which the position detection has failed needs to be transported to the outside in order to receive the following workpiece. In such a case, a user (an operator, a person who operates the device, or the like) is supposed to visually set position coordinates with some amount of accuracy, even if the accuracy is not as high as that of position coordinates detected when the position detection of the workpiece has been successfully performed, in order to transport the workpiece to the outside with no problems. However, there are cases in which the production line is stopped until the user arrives or a stop time of the production line is extended due to the user's mishandling, and there is a concern that productivity will be degraded if the position detection of the workpiece has failed.

SUMMARY

According to an aspect of the disclosure, there is provided a position control system that controls a position of an object that is moved by a moving mechanism. The position control system includes: a control portion that controls the moving mechanism; an acquisition portion that acquires image data that is obtained by imaging the object; a first detection portion that detects the position of the object on the basis of the image data in accordance with first detection processing; a first output portion that outputs a first control command for controlling the position of the object to the control portion in a case in which the first detection portion has detected the position of the object; a second detection portion that detects the position of the object on the basis of the image data in accordance with second detection processing that is more robust than the first detection processing in a case in which the first detection portion has not detected the position of the object; and a second output portion that outputs a second control command for controlling the position of the object to the control portion on the basis of a detection result performed by the second detection portion.

According to another aspect of the disclosure, there is provided a position detection device that detects a position of an object that is moved by a moving mechanism. The position detection device includes: an acquisition portion that acquires image data that is obtained by imaging the object; a first detection portion that detects the position of the object on the basis of the image data in accordance with first detection processing; a first output portion that outputs a first control command for controlling the position of the object in a case in which the first detection portion has detected the position of the object; a second detection portion that detects the position of the object on the basis of the image data in accordance with second detection processing that is more robust than the first detection processing in a case in which the first detection portion has not detected the position of the object; and a second output portion that outputs a second control command for controlling the position of the object on the basis of a detection result performed by the second detection portion.

According to still another aspect of the disclosure, there is provided a non-transitory recording medium, wherein a control program is installed in the non-transitory recording medium and realizes, by being executed by a computer, a position detection device that detects a position of an object that is moved by a moving mechanism. The control program causes the computer to execute: an acquiring step of acquiring image data that is obtained by imaging the object; a first detection step of detecting the position of the object on the basis of the image data in accordance with a first detection processing; a first output step of outputting a first control command for controlling the position of the object in a case in which the position of the object has been detected in the first detection step; a second detection step of detecting the position of the object on the basis of the image data in accordance with a second detection processing that is more robust than the first detection processing in a case in which the position of the object has not been detected in the first detection step; and a second output step of outputting a second control command for controlling the position of the object on the basis of a detection result in the second detection step.

BRIEF DESCRIPTION OF THE DRAWINGS

FIG. 11 is a diagram for explaining a result of evaluating processing flows in the position detection device according to the embodiment.

FIG. 12 is a diagram illustrating an example for explaining a difference in robustness between first detection processing and second detection processing in the position detection device according to the embodiment.

FIG. 13 is a diagram illustrating an example for explaining a difference in robustness between the first detection processing and the second detection processing in the position detection device according to the embodiment.

FIG. 14 is a diagram illustrating an example for explaining a difference in robustness between the first detection processing and the second detection processing in the position detection device according to the embodiment.

FIG. 15 is a diagram illustrating an example for explaining a difference in robustness between the first detection processing and the second detection processing in the position detection device according to the embodiment.

DESCRIPTION OF THE EMBODIMENTS

Figure 1:
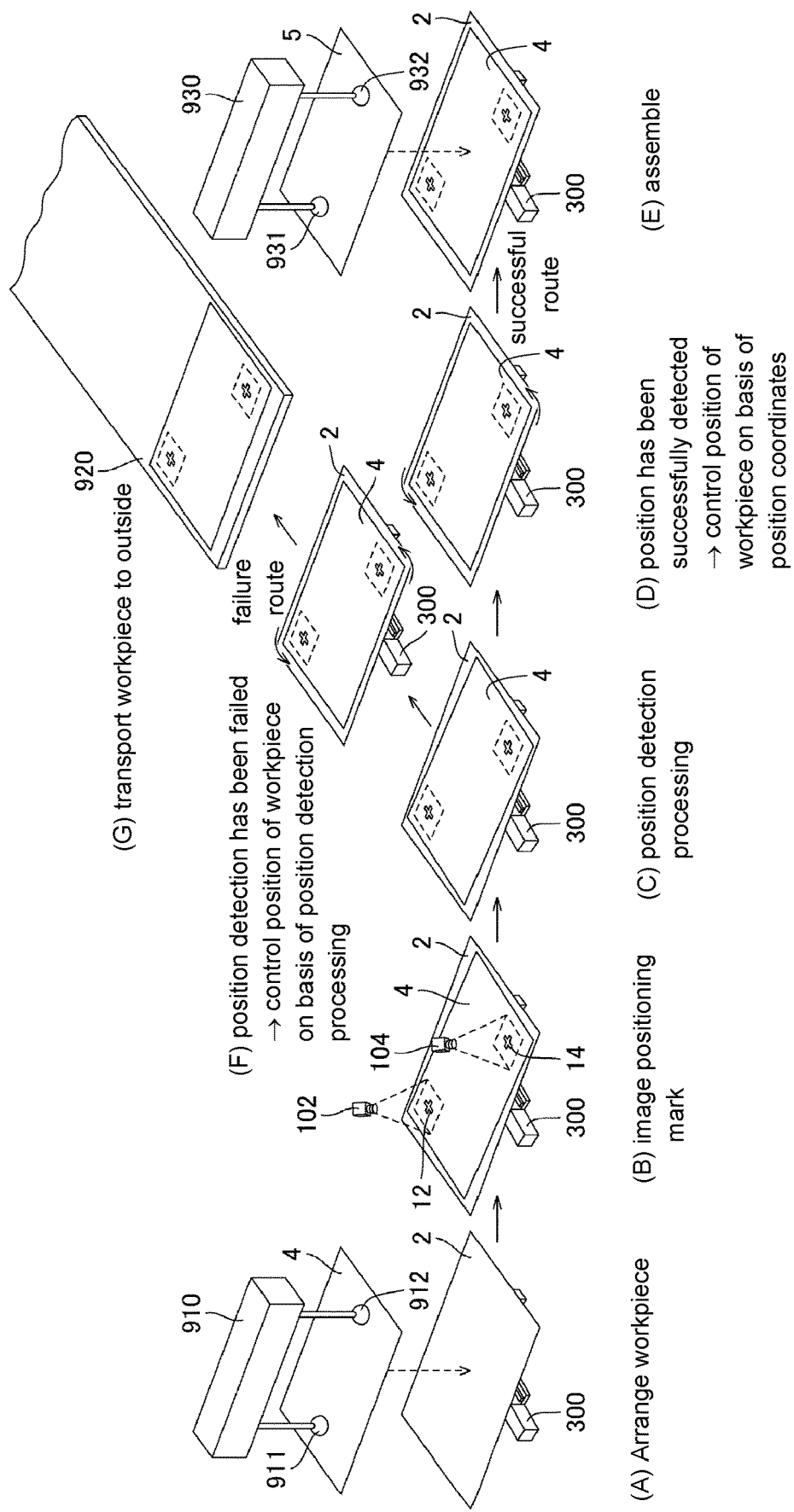
FIG. 1 is a diagram for explaining an example of a production line to which a position control system according to an embodiment is applied.

The disclosure provides a technology by which it is possible to prevent productivity from being degraded to the maximum extent in a case in which the position of the object has not been detected.

An embodiment of the invention will be described in detail with reference to the drawings. Note that the same reference numerals will be given to the same or corresponding parts in the drawing, and that description thereof will not be repeated.

A. Example of Production Line to which Position Control System is Applied

FIG. 1 is a diagram for explaining an example of a production line to which a position control system 1 according to an embodiment is applied.

Referring to FIG. 1, the position control system 1 according to the embodiment performs alignment by using image processing in a production line or the like of industrial products. The alignment typically means processing of arranging a workpiece at an original position in the production line or the like. In an example of such alignment, the position control system 1 arranges an object (workpiece) 4 at an accurate position by detecting a position of the workpiece 4 on the basis of image data obtained by imaging the workpiece 4 arranged on an upper surface of a stage panel 2 and controlling a stage 300 on the basis of detected position data (position coordinates in the embodiment).

Specifically, the workpiece 4 transported by arms 911 and 912 of a transport robot 910 is arranged on the upper surface of the stage panel 2, the position of which is controlled by the stage 300, as illustrated in (A) of FIG. 1. As illustrated in (B) of FIG. 1, positioning marks 12 and 14 are provided on an upper surface of the workpiece 4. In the embodiment, cross marks are printed on at least a part of four corners of the workpieces 4 as the positioning marks 12 and 14. Note that the locations are not limited to the four corners of the workpiece 4 and may be provided at any positions on the workpiece 4, such as at the center. In addition, the positioning marks are not limited to cross marks and may be any shape such as a rectangle, a circle, a fan shape, or an arbitrary polygonal shape.

The positioning marks 12 and 14 are imaged by cameras 102 and 104, respectively. Note that a single camera may image the plurality of positioning marks while moving instead of assigning a single camera to each of the plurality of positioning marks. As illustrated in (C) of FIG. 1, processing of detecting the position of the workpiece is performed on the basis of imaging data of the positioning marks 12 and 14 obtained by the cameras 102 and 104.

In a case in which the position detection of the workpiece 4 has been successfully performed, the stage panel 2 moves by the stage 300 being controlled on the basis of detected position coordinates of the workpiece 4 as illustrated in (D) of FIG. 1. Here, the position of the workpiece 4 is corrected to an original position if the position of the workpiece 4 is not within required accuracy. For example, the position of the workpiece 4 is corrected to match the position of an assembled member 5, which will be described later, by controlling the stage 300 to rotate the stage panel 2 counterclockwise. Note that the position of the workpiece 4 is detected again on the basis of the image data obtained by imaging the positioning marks by the cameras 102 and 104 again after the position of the workpiece 4 is corrected, although this is not illustrated in the drawing. Then, it is determined whether or not the position of the workpiece 4 is within the required accuracy again. In a case in which the position of the workpiece 4 is within the required accuracy, as illustrated in (E) of FIG. 1, the workpiece 4 is guided to a successful route in accordance with the movement of the stage 300, and the assembled member 5 transported by arms 931 and 932 of a transport robot 930 is attached to the workpiece 4. An industrial product is assembled in this manner.

Meanwhile, in a case in which the position detection of the workpiece 4 has failed, position coordinates that are accurate to some extent have to be set even if the accuracy is not as high as that of the position coordinates detected when the position detection of the workpiece 4 has been successfully performed in order to transport the workpiece 4 from the production line to the outside with no problem. One example of a reason for this is that the width of a transport path 920 for transporting the workpiece 4 to the outside is fixed as illustrated in (G) of FIG. 1 as will be described later. Specifically, in a case in which a command indicating the position coordinates with respect to the stage 300 has not been input or in a case in which the command indicating the position coordinates with respect to the stage 300 has been input but the position coordinates are not appropriate, a situation in which the workpiece 4 is not accommodated in the transport path 920 may occur. If so, there is a concern that the production line may stop. Therefore, the position coordinates that are accurate to some extent have to be set in order to smoothly receive the following workpiece 4 in a case in which the position detection of the workpiece 4 has failed.

Therefore, the user is supposed to manually input position coordinates of the workpiece 4 in the related art in a case in which the position detection of the workpiece 4 has failed. However, there are cases in which the production line stops until the user arrives or a stop time of the production line is extended due to mishandling of the user, and there is a concern that productivity will be degraded if the position coordinates are manually input by the user every time the position detection of the workpiece 4 has failed.

Thus, in the position control system 1 according to the embodiment, the position coordinates manually input by the user in the past (hereinafter, also referred to as manually input coordinates) are associated and stored with the image data. Then, the position detection processing is performed for the second time on the basis of the accumulated pair of manually input coordinates and the image data in a case in which the position detection of the workpiece 4 has failed. Since the position detection processing performed the second time is more robust than the position detection processing performed the first time as in (C) of FIG. 1, the probability of the position detection being successfully performed in the position detection processing performed the second time increases even if the position detection has failed in the position detection processing performed the first time. As a result, the position coordinates can be automatically set without the user manually inputting the position coordinates.

As illustrated in (F) of FIG. 1, the position coordinates are detected by the position detection processing performed the second time, and the stage 300 is controlled on the basis of the position coordinates. For example, the position of the workpiece 4 is corrected to be accommodated in the transport path 920 by controlling the stage 300 to rotate the stage panel 2 counterclockwise. Then, the workpiece 4 is guided to a failure route in accordance with the movement of the stage 300, and the workpiece 4 is transported from the production line to the outside by the transport path 920 as illustrated in (G) of FIG. 1.

B. Overall Configuration of Position Control System

Figure 2:
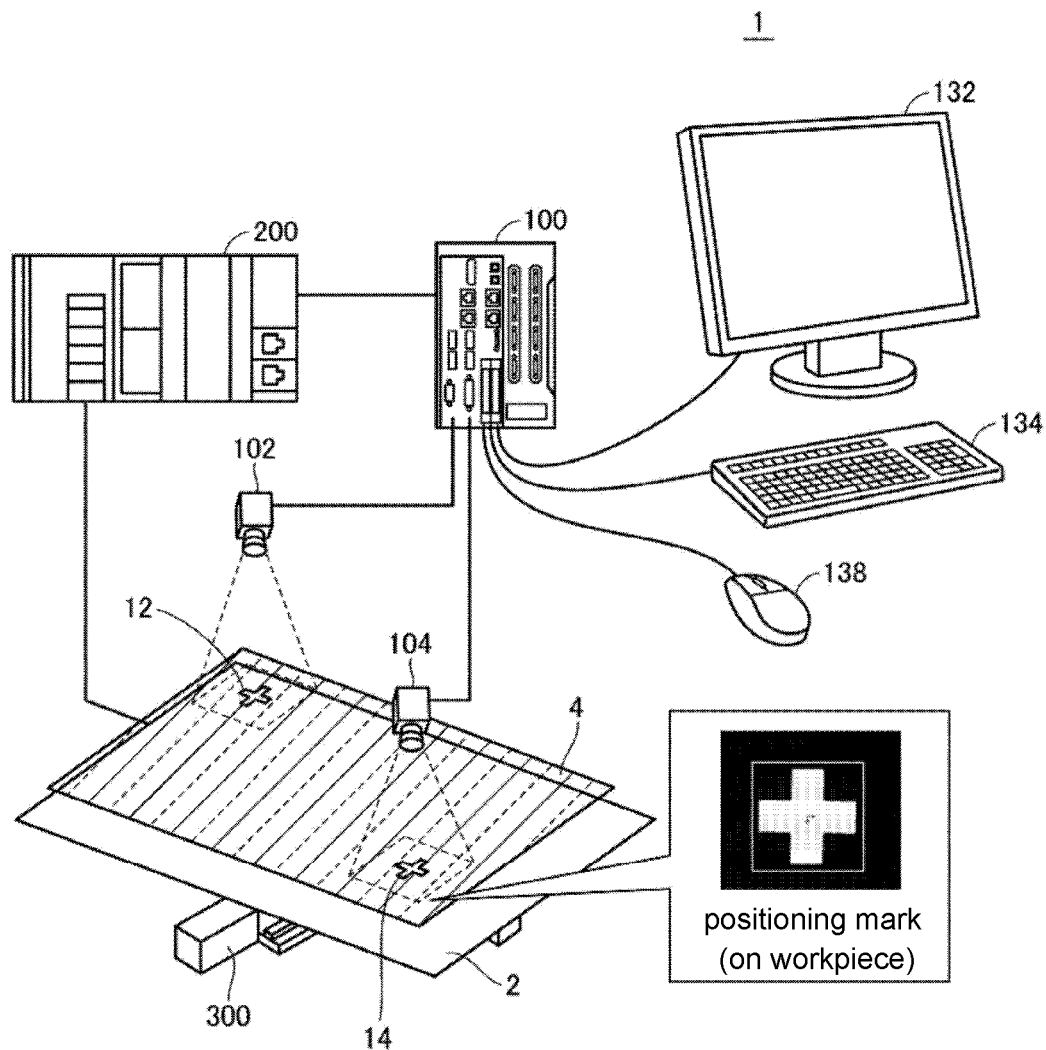
FIG. 2 is a diagram illustrating an overall configuration of the position control system according to the embodiment.

FIG. 2 is a diagram illustrating an overall configuration of the position control system 1 according to the embodiment. As illustrated in FIG. 2, the position control system 1 includes a position detection device 100, a motion controller 200, and a stage 300.

The position detection device 100 specifies the position of the workpiece 4 by acquiring the image data obtained by capturing images with one or more cameras (the cameras 102 and 104 in the example in FIG. 2) and detecting the positions of the positioning marks 12 and 14 included in the acquired image data. The position detection device 100 outputs a command for arranging the workpiece 4 at the accurate position to the motion controller 200 on the basis of the specified position of the workpiece 4.

The motion controller 200 realizes alignment of the workpiece 4 by giving a command to the stage 300 in accordance with the command from the position detection device 100.

The stage 300 may have any degree of freedom as long as the stage 300 is a mechanism with which the workpiece 4 can be arranged at the accurate position. In the embodiment, the stage 300 can give horizontal displacement and rotational displacement to the workpiece 4.

C. Overall Configuration of Position Detection Device

Figure 3:
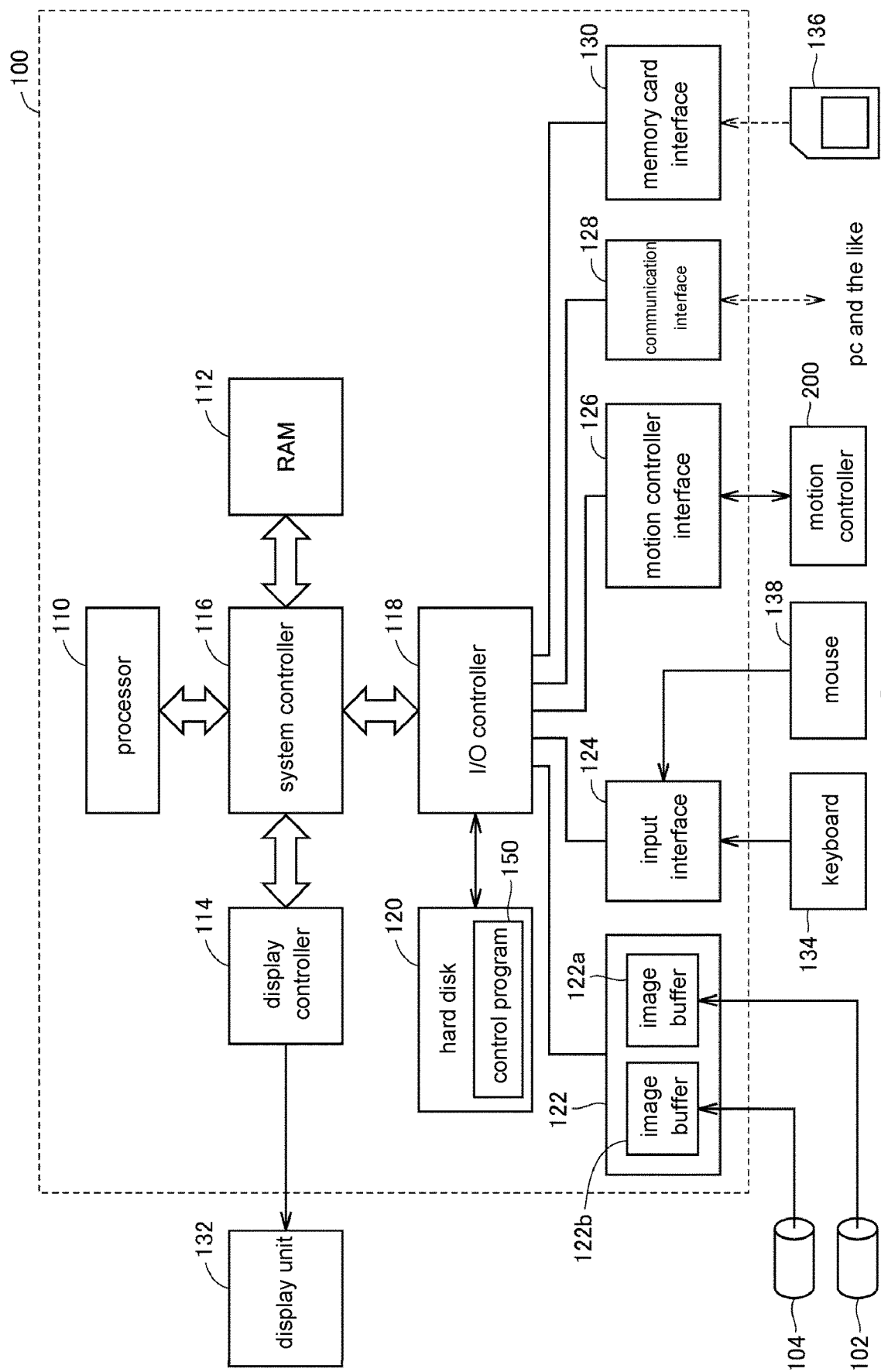
FIG. 3 is a diagram illustrating a hardware configuration of the position detection device according to the embodiment.

FIG. 3 is a diagram illustrating a hardware configuration of the position detection device 100 according to the embodiment. As illustrated in FIG. 3, the position detection device 100 typically has a structure in accordance with a general-purpose computer architecture and realizes various kinds of processing, which will be described later, by a processor executing a program installed in advance.

More specifically, the position detection device 100 includes a processor 110 such as a central processing unit (CPU) and a micro-processing unit (MPU), a RAM 112 (random access memory (RAM) 112), a display controller 114, a system controller 116, an input/output (I/O) controller 118, a hard disk 120, a camera interface 122, an input interface 124, a motion controller interface 126, a communication interface 128, and a memory card interface 130. These respective parts are connected to each other around the system controller 116 to be able to communicate data.

The processor 110 realizes target computation processing by exchanging programs (codes) and the like with the system controller 116 and executing the programs in a predetermined order.

The system controller 116 is connected to the processor 110, the RAM 112, the display controller 114, and the I/O controller 118 via a bus, exchanges data with the respective parts, and manages processing of the entire position detection device 100.

The RAM 112 is typically a volatile storage device such as a dynamic random access memory (DRAM) and holds a program read from the hard disk 120, or camera images (image data) acquired by the cameras 102 and 104, data related to the image data (manually input coordinates and the like), workpiece data, and the like.

The display controller 114 is connected to a display unit 132 and outputs a signal for displaying various kinds of information to the display unit 132 in accordance with an internal command from the system controller 116.

The I/O controller 118 controls data exchange with a recording medium or an external device connected to the position detection device 100. More specifically, the I/O controller 118 is connected to the hard disk 120, the camera interface 122, the input interface 124, the motion controller interface 126, the communication interface 128, and the memory card interface 130.

The hard disk 120 is typically a nonvolatile magnetic storage device and stores various setting values in addition to a control program 150 such as algorithms that are executed by the processor 110. The control program 150 installed on the hard disk 120 is distributed in a state in which the control program 150 is stored in the memory card 136 or the like. Note that a semiconductor storage device such as a flash memory or an optical storage device such as a digital versatile disc random access memory (DVD-RAM) may be employed instead of the hard disk 120.

The camera interface 122 acquires the image data obtained by imaging the workpiece and relays data transmission between the processor 110 and the cameras 102 and 104. The camera interface 122 includes image buffers 122a and 122b for temporarily accumulating the image data from the cameras 102 and 104, respectively. Although a single image buffer that can be shared by the cameras may be provided for the plurality of cameras, it is preferable to independently arrange a plurality of buffers corresponding to the respective cameras in order to increase the processing speed.

The input interface 124 relays data transmission with the processor 110 and an input device such as a keyboard 134, a mouse 138, a touch panel, or a dedicated console.

The motion controller interface 126 relays data transmission between the processor 110 and the motion controller 200.

The communication interface 128 relays data transmission between the processor 110 and another personal computer, a server device, or the like, which is not illustrated in the drawing. The communication interface 128 is typically Ethernet (registered trademark), a Universal Serial Bus (USB), or the like.

The memory card interface 130 relays data transmission between the processor 110 and the memory card 136 that is a recording medium. The memory card 136 is distributed in a state in which the control program 150 and the like executed by the position detection device 100 are stored, and the memory card interface 130 reads the control program from the memory card 136. The memory card 136 is a general-purpose semiconductor storage device such as a secure digital (SD), a magnetic recording medium such as a flexible disk, an optical recording medium such as a compact disc read only memory (CD-ROM), or the like. Alternatively, a program downloaded from a distribution server or the like may be installed on the position detection device 100 via the communication interface 128.

In a case in which a computer with a structure that follows a general-purpose computer architecture as described above is utilized, an operating system (OS) for providing basic functions of the computer may be installed in addition to an application for providing the functions according to the embodiment. In this case, the control program according to the embodiment may call necessary modules from among program modules provided as a part of the OS in a predetermined order and/or at a predetermined timing and execute processing.

Further, the control program according to the embodiment may be incorporated as a part of another program and provided. The program itself does not include modules included in the other program described above with which it is combined even in that case, and the processing is executed in cooperation with the other program described above. That is, the control program according to the embodiment may be in a form in which the control program is incorporated into the other program.

Note that, alternatively, some or all of the functions provided by executing the control program may be implemented as a dedicated hardware circuit.

D. Overall Configuration of Motor Controller

Figure 4:
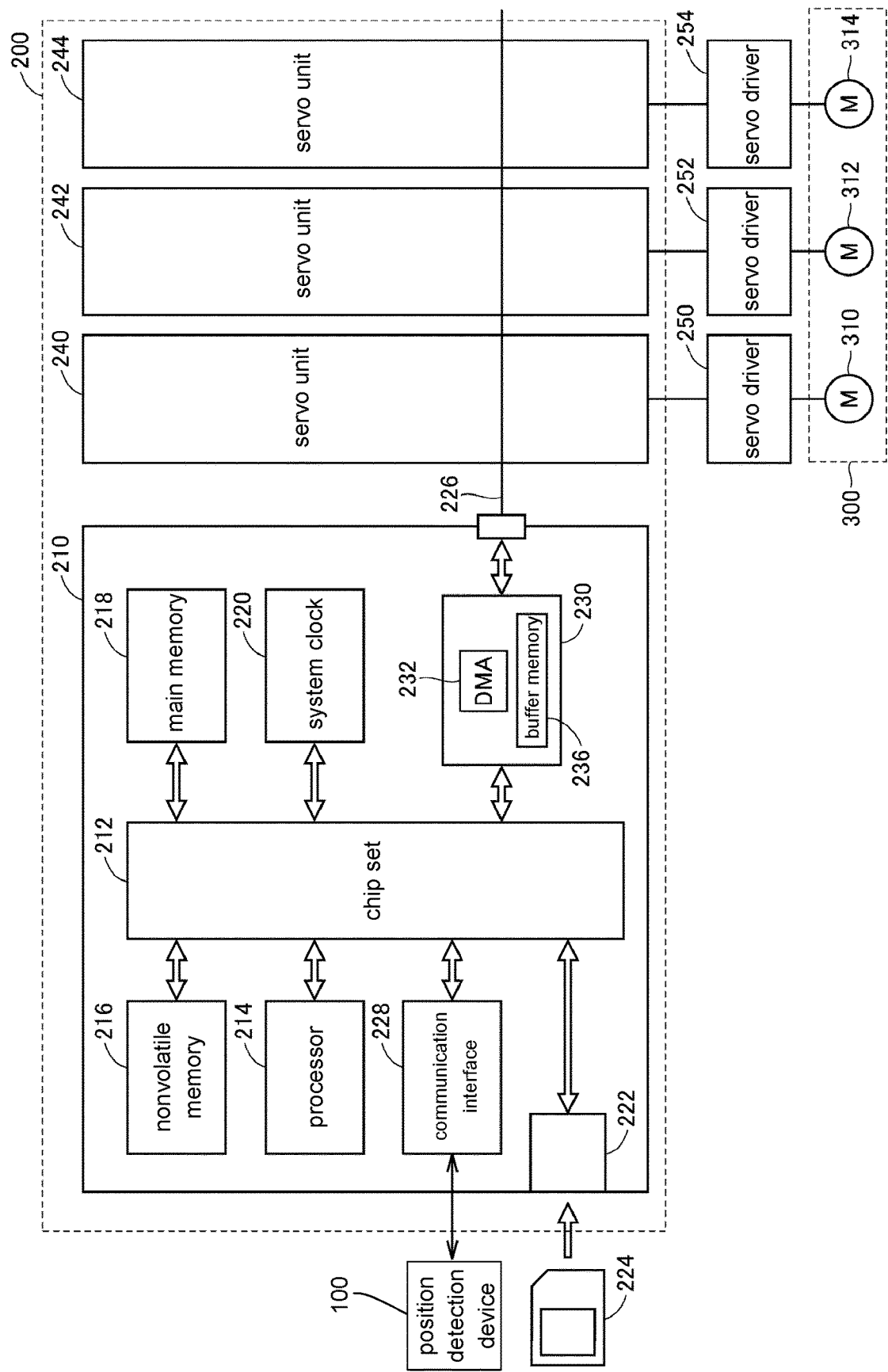
FIG. 4 is a diagram illustrating a hardware configuration of a motion controller according to the embodiment.

FIG. 4 is a diagram illustrating a hardware configuration of the motion controller 200 according to the embodiment. As illustrated in FIG. 4, the motion controller 200 includes a main control unit 210 and a plurality of servo units 240, 242, and 244. In the position control system 1 according to the embodiment, an example in which the stage 300 has servo motors 310, 312, and 314 corresponding to three axes is illustrated, and the servo units 240, 242, and 244 corresponding to the number of the axes are included in the motion controller 200.

The main control unit 210 manages overall control performed by the motion controller 200. The main control unit 210 is connected to the servo units 240, 242, and 244 via an internal bus 226 and mutually exchange data. The servo units 240, 242, and 244 respectively output control commands (typically, drive pulses) to servo drivers 250, 252, 254 in accordance with internal commands or the like from the main control unit 210. The servo drivers 250, 252, and 254 respectively drive the servo motors 310, 312, and 314 connected thereto.

The main control unit 210 includes a chip set 212, a processor 214, a nonvolatile memory 216, a main memory 218, a system clock 220, a memory card interface 222, a communication interface 228, and an internal bus controller 230. The chip set 212 and other components are respectively coupled via various buses.

The processor 214 and the chip set 212 typically have configurations in accordance with general-purpose computer architectures. That is, the processor 214 interprets and executes order codes that are sequentially supplied in accordance with an internal clock from the chip set 212. The chip set 212 exchanges internal data with various components connected thereto and generates order codes necessary for the processor 214. The system clock 220 produces a system clock at a predetermined cycle and provides the system clock to the processor 214. The chip set 212 has a function of caching data and the like obtained as a result of executing computation processing in the processor 214.

The main control unit 210 has a nonvolatile memory 216 and a main memory 218. The nonvolatile memory 216 holds an OS, a system program, a user program, data definition information, log information, and the like in a nonvolatile manner. The main memory 218 is a volatile storage region, holds various programs to be executed by the processor 214, and is also used as an operation memory when the various programs are executed.

The main control unit 210 has the communication interface 228 and the internal bus controller 230 as communication portions. These communication circuits transmit and receive data.

The communication interface 228 exchanges data with the position detection device 100. The internal bus controller 230 controls the exchange of data via the internal bus 226. More specifically, the internal bus controller 230 includes a buffer memory 236 and a DMA 232 (dynamic memory access (DMA) control circuit 232).

The memory card interface 222 connects the detachable memory card 224 and the chip set 212 to the main control unit 210.

E. Screen Display Example when Processing Flow is Set

Figure 5:
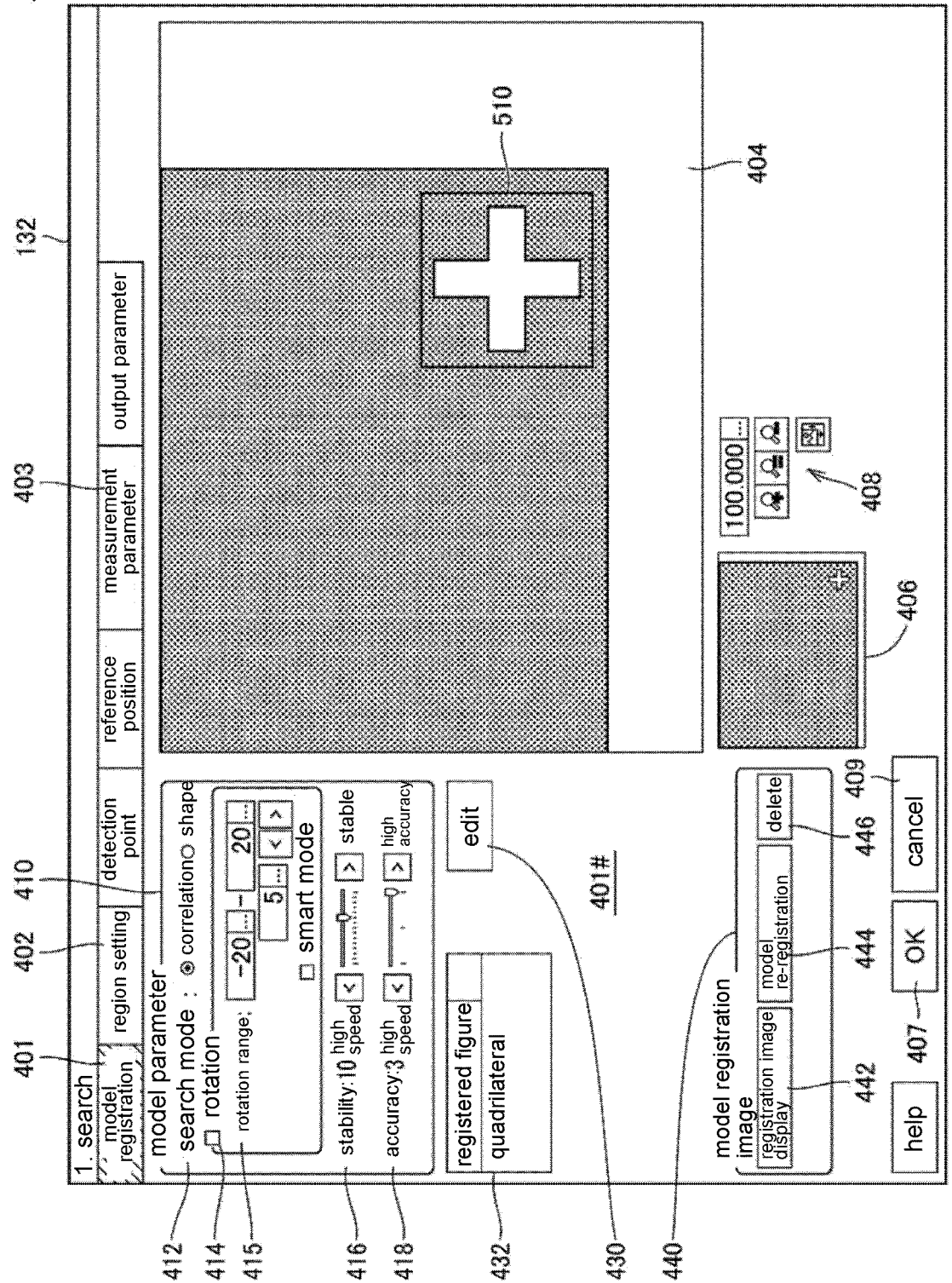
FIG. 5 is a diagram illustrating a screen display example when a processing flow is set in the position detection device according to the embodiment.
Figure 6:
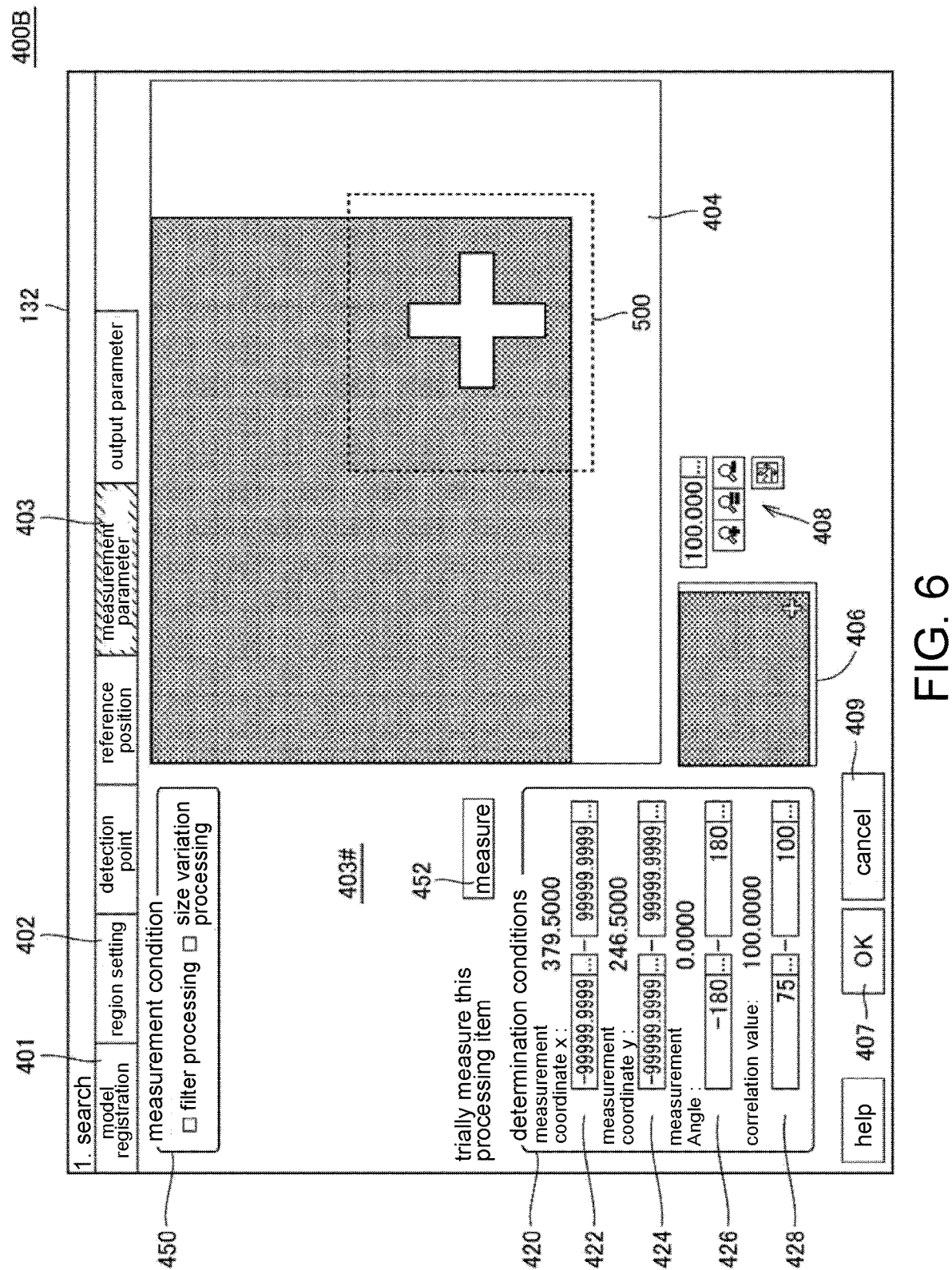
FIG. 6 is a diagram illustrating a screen display example when a processing flow is set in the position detection device according to the embodiment.

FIGS. 5 and 6 are diagrams illustrating a screen display example when a processing flow is set in the position detection device 100 according to the embodiment. FIGS. 5 and 6 illustrate an example of image processing in a case in which algorithms for search detection processing are set as the processing flow. Note that the processor 110 and a graphic board and the like, which are not illustrated in the drawing, in the position detection device 100 cooperate with each other, thereby displaying the screens as illustrated in FIGS. 5 and 6. Such screen display is realized by a graphical user interface (GUI) program that is incorporated as a part of an operating system (OS), and the GUI also provides an environment for performing various kinds of user setting by using a cursor or an arrow icon, which are operated by the user through the keyboard 134 or the mouse 138, on the screen.

The "processing flow" is algorithms and parameter setting values that are used for the position detection. The user can select algorithms and parameter setting values used for the position detection as the processing flow via the screens illustrated in FIGS. 5 and 6.

The "search detection processing" is processing of specifying position coordinates by registering feature portions of the workpiece to be detected as an image pattern (model) in advance and searching for the registered feature portions of the model from the image data. In one example, the position detection device 100 detects the positions of the positioning marks by calculating a degree of darkness for each coordinate and specifying feature portions while scanning the image data, and calculating similarity between the specified feature portions and the feature portions of the registered model. Note that the search detection processing is not limited to the aforementioned method, and that a known method may be used.

Note that other processing may be used for the position detection regardless of the search detection processing. For example, the user may be allowed to select edge detection processing for the position detection. The "edge detection processing" is processing of specifying position coordinates by calculating a degree of darkness for each coordinate by scanning the image data from both the X axis (for example, the horizontal axis) and the Y axis (for example, the vertical axis) and specifying, as an edge, a portion where a difference between degrees of darkness between adjacent coordinates exceeds a threshold value. The scanning region can be set in advance by the user as an edge region. Note that the edge detection processing is not limited to the aforementioned method, and that a known method may be used.

As illustrated in FIG. 5, if a tab 401 for "model registration" is selected, then a setting screen 400A is displayed on the display unit 132. The setting screen 400A includes a model registration area 401#, an image display area 404, an entire display area 406, and a display control icon group 408.

Image data acquired by the cameras 102 and 104 are displayed in the image display area 404. During various kinds of setting, an image displayed in the image display area 404 is updated in real time. The image data obtained by the cameras 102 and 104 is displayed in the entire display area 406 in a manner similar to that in the image display area 404. However, the entire target image data is displayed in the entire display area 406 independently from the display range in the image display area 404. Further, the display range and display accuracy of the image data to be displayed in the image display area 404 are changed in accordance with user's operation (enlargement, size reduction, or the like) performed on the display control icon group 408.

A model editing button 430, a registration figure display box 432, a model parameter setting area 410, and a model registration image area 440 are displayed in the model registration area 401#.

In a case in which the user registers a model to be searched, a reference object including the model is acquired in advance by using the cameras 102 and 104, and an operation is performed in a state in which the acquired image data is displayed in the image display area 404 and the entire display area 406.

First, if the user operates the mouse 138 or the like and presses the model editing button 430, a depiction tool dialog, which is not illustrated in the drawing, is displayed. The user operates the depiction tool dialog and designates a range to be registered as a model in a superimposed manner on the image data displayed in the image display area 404. FIG. 5 illustrates a case in which the quadrilateral range including the positioning marks (cross marks) has been set as a model 510 in the image display area 404. In a case in which some model has already been registered, the shape of the registered model (the "quadrilateral" in the case of FIG. 5) is displayed in the registration figure display box 432. Note that the shape registered as a model is not limited to the quadrilateral, and that the shape may be any shape such as a rectangle, a circle, a fan shape, or an arbitrary polygon.

In a case in which setting of the registered model is changed, the user presses a necessary button in the model registration image area 440. The image data used for model registration is saved, and only parameters related to the registered model can be changed later. More specifically, if the registration screen display button 442 is pressed, the image data used for the model registration is displayed. If the registration screen display button 442 is pressed again, the display is switched to display of image data that is currently input. If the model re-registration button 444 is pressed, the registered model image is maintained with no change and is re-registered as a model in a state in which the other parameters are changed. Further, if a deletion button 446 is pressed, then the registered model is deleted.

The model parameter setting area 410 receives selection of a search mode as a setting item. The search mode is for selection of a method of evaluating how high the similarity with the model is. In the search mode, any of "correlation" and "shape" can be selected by operating a radio button 412. "Correlation" is a method of measuring similarity by calculating a correlation value with the model by normalizing brightness of the input image data. Meanwhile, "shape" is an algorithm for measuring similarity on the basis of a degree of coincidence with a contour shape of the model. In general, it is possible to more stably perform measurement in the "correlation" mode.

If "correlation" is selected in the search mode, it is possible to set "rotation", "stability", and "accuracy". Meanwhile, if "shape" is selected in the search mode, it is possible to set "rotation range" and "stability".

As for "rotation", a plurality of models are internally generated by rotating a registered model by a predetermined angle, and parameter setting values related to processing of measuring similarity is designated on the basis of the respective generated models in a case in which the workpiece is rotated. That is, if a rotation check box 414 is checked, then rotation processing is activated. Then, if a rotation range (a rotation angle upper limit value and a rotation angle lower limit value) and a pitch angle are respectively input to a numerical value box 415, generation of a model by rotating the workpiece by the pitch angle in the rotation range is designated. In general, stability increases but a processing time increases as the pitch angle decreases. Note that it is possible to set a smart mode capable of performing rotation search at a high speed.

As for "stability", which of measurement stability and a processing speed a priority is to be placed on is set. That is, a slide bar 416 is set to some value in a range with a predetermined width (1 to 15, for example), a processing time becomes shorter as the set value is smaller, and the processing time becomes longer while the stability increases as the value is larger.

As for "accuracy", which of measurement position accuracy and a processing speed a priority is to be placed on is set. That is, a slide bar 418 is set to some value in a range with a predetermined width (1 to 3, for example), a processing time becomes shorter as the set value is smaller, and the processing time becomes longer while the accuracy increases as the value is larger.

The aforementioned content is reflected in the position detection processing by pressing an OK button 407. Note that non-reflected content is reset in a case in which a cancellation button 409 is pressed.

If a tab 402 for "region setting" is selected after such model registration, a setting screen for designating a range from which the model is searched is displayed (illustration thereof is omitted). The user can set an arbitrary region on the image display area 404 as a search region in the setting screen. Note that although the entire input image data can be set as the search region, it is possible to shorten the processing time by restricting the search region to a partial region.

If a tab 403 for "measurement parameter" is selected after the input of the region setting, a setting screen 400B is displayed as illustrated in FIG. 6. The setting screen 400B includes a measurement parameter setting area 403#, an image display area 404, an entire display area 406, and a display control icon group 408. A determination condition setting area 420, a measurement condition setting area 450, and a measurement button 452 are displayed in the measurement parameter setting area 403#.

The positioning marks and a search region 500 decided in the region setting are displayed in the image display area 404.

The measurement condition setting area 450 receives valid/invalid of "filter processing" and valid/invalid of "size variation processing" as additional processing (hereinafter, also referred to as additional processing) of the search detection processing.

The "filter processing" s processing for facilitating the detection of the positioning marks by emphasizing portions corresponding to the positioning marks in the image data. In a case in which the positioning marks are printed, for example, a difference in shading between the positioning marks and surroundings thereof decreases, and it becomes difficult to identify boundaries therebetween if print accuracy is poor. Even in such a case, it is possible to perform the search detection processing after emphasizing the difference in shading between the positioning marks and the surroundings thereof if the filter processing is set to be effective. However, since it takes time to perform image processing for adjusting the difference in shading between the positioning marks and the surroundings thereof in the filter processing, the entire processing time of the search detection processing becomes longer.

The "size variation processing" is processing for facilitating detection of the positioning marks by adding processing in accordance with the sizes of the portions corresponding to the positioning marks in the image data even in a case in which the sizes are different from original sizes. If the printing accuracy of the positioning marks is poor, for example, the positioning marks may be printed with sizes different from those in the registered model image. Even in such a case, it is possible to perform the search detection processing in consideration of the sizes of the positioning marks if the size variation processing is set to be effective. In one example, when feature portions specified by scanning the image data are compared with those in the registered model image, a plurality of models are generated by varying the size of the model image. Thereafter, an entirety or a part of all the generated plurality of model images are compared with the feature portions. Then, the positions of the feature portions are specified by comparison based on a model image that shows the highest coincidence. However, since it takes time to perform processing in accordance with the sizes of the positioning marks in the size variation processing, the entire processing time of the search detection processing becomes longer.

In a case in which an item in the measurement condition setting area 450 is set or changed, the user presses the measurement button 452 and causes determination on whether or not it is possible to properly execute the search detection processing.

The determination condition setting area 420 receives conditions for determining that coincidence with the registered model ("OK") is established in the similarity (correlation values) at the respective measured coordinates. More specifically, it is possible to set four items, namely, a measurement coordinate X, a measurement coordinate Y, a measurement angle, and a correlation value as setting items. For the measurement coordinate X and the measurement coordinate Y, the respective coordinate ranges in which the measured coordinate values (the X coordinate value and the Y coordinate values) are to be included are set by inputting the respective numerical value ranges to numerical value boxes 422 and 424. For the measurement angle, an angular range in which a measured rotation angle of the model is to be included is set by inputting a numerical value range to a numerical box 426. Further, for the correlation value, a numerical value in which the measured correlation value with the model is to be included is set by inputting a numerical value range to a numerical value box 428.

Note that in the aforementioned search detection processing, which position (coordinates) in the input image has high similarity is searched by sequentially updating a region in which similarity with registered model is calculated in the input image. Therefore, similarity at a plurality of respective coordinates in the input image is calculated as actual internal processing. Therefore, results of detection of second and third similarity may be output in addition to the highest value among all calculated similarity values.

As described above, the user can select the tab 401 for "model registration", the tab 402 for "region setting", or the tab 403 for "measurement parameter" and set a processing flow (algorithms, parameter setting values) used for the position detection on various setting screens displayed at that time.

"Algorithms" according to the embodiment means a method of the position detection and additional processing related to the method (additional processing). For example, the method of the position detection included in the algorithms includes search detection processing and edge detection processing. Since the algorithms are main algorithms for performing the position detection, the algorithms will also be referred to as measurement algorithm below. The additional processing included in the algorithms includes the filter processing and the size variation processing.

Since the algorithms include the method of position detection (measurement algorithm) and the additional processing related to the method (additional processing), the amount of processing during the position detection changes by changing the algorithms, and this is accompanied by a change in the processing time. If the additional processing is activated as an algorithm, for example, the probability of successful position detection increases and the robustness increases while the amount of processing during the position detection increases corresponding to the increase and the processing time becomes longer. In addition, if a plurality of types of algorithms are used, the probability of successful position detection increases and the robustness increases while the amount of processing during the position detection by the amount of increase and the processing time becomes longer. Note that the aforementioned algorithms are just examples, and any method of position detection and any additional processing related to the method may be included as long as the robustness changes by the change in the algorithms.

The "parameter setting values" means various setting values used when the position detection in accordance with the algorithms is performed. For example, various parameter setting values that can be set in the model parameter setting area 410 illustrated in FIG. 5, a setting value of a search region that can be set by selecting the tab 402 for "region setting", and various parameter setting values that can be set in the determination condition setting area 420 illustrated in FIG. 6 are included as the parameter setting values in the search detection processing. Since the parameter setting values are various setting values used for performing position detection in accordance with algorithms, the amount of processing at the time of the position detection changes by changing the parameter setting values, which is accompanied by a change in the processing time. Although the probability of successful position detection increases and the robustness increases if the parameter setting values are set to widen the search region, for example, the amount of processing during the position detection increases and the processing time also increases by the amount of increase. In addition, although the probability of successful position detection increases and the robustness increases if a plurality of types of parameter setting values are used, for example, the amount of processing during the position detection increases and the processing time increases by the amount of increase. Note that the aforementioned parameter setting values are just examples, and that any types of parameter setting values may be included as long as the robustness changes by the change in the values.

F. Alignment Processing

Figure 7:
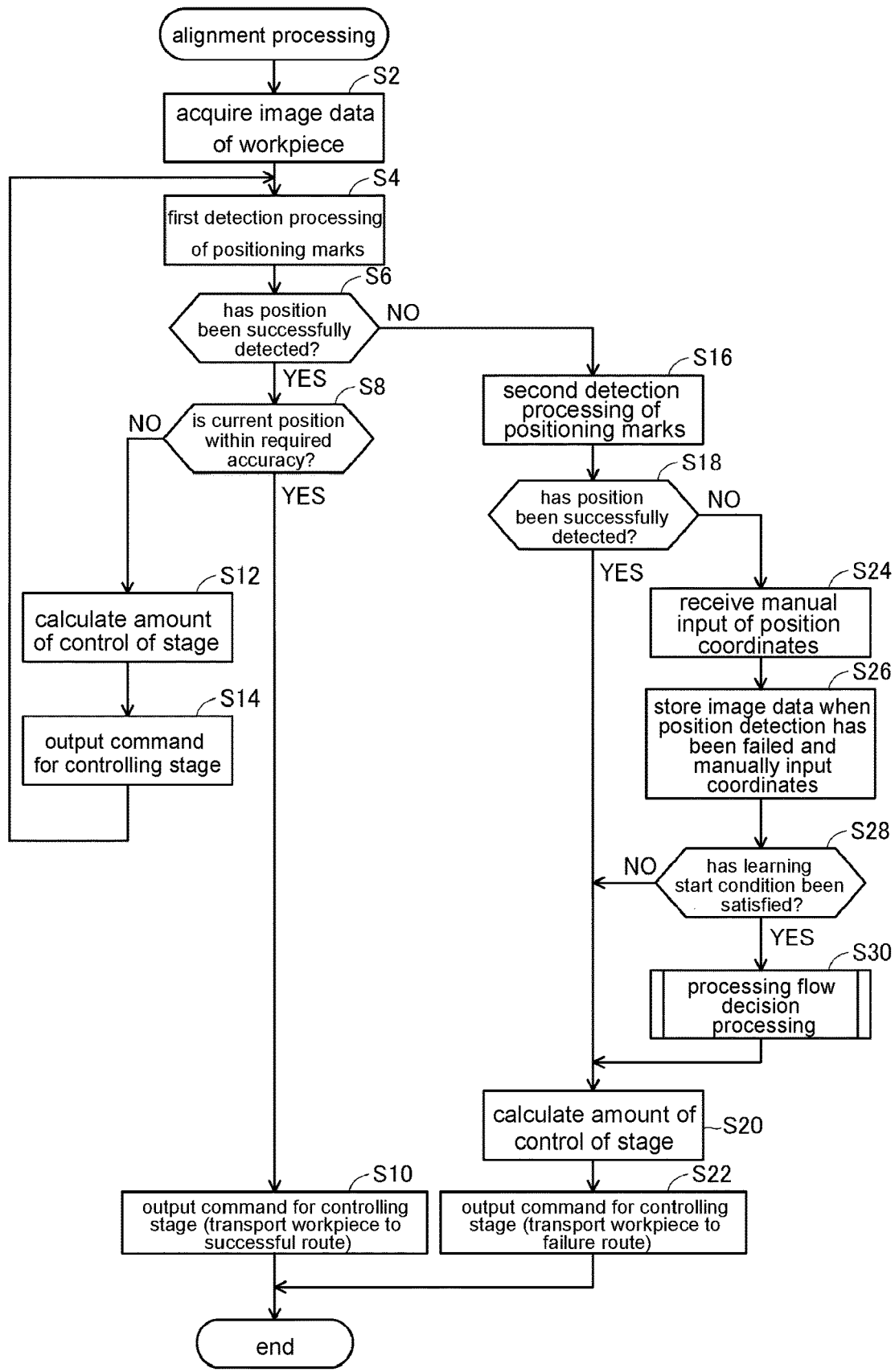
FIG. 7 is a flowchart illustrating alignment processing that the position detection device according to the embodiment executes.

FIG. 7 is a flowchart illustrating alignment processing that the position detection device 100 according to the embodiment executes. Note that the respective steps in the following description will be simply abbreviated as "S".

As illustrated in FIG. 7, the position detection device 100 acquires image data of a workpiece by imaging the workpiece, which has been transported by the stage 300, with the cameras 102 and 104 (S2). The position detection device 100 tries to perform position detection of the workpiece on the basis of the image data in accordance with first detection processing that is the position detection processing performed the first time (S4). Specifically, the position detection device 100 tries to perform the position detection of the positioning marks on the basis of the image data in accordance with a processing flow set by the user on the screens as illustrated in FIGS. 5 and 6.

The position detection device 100 determines whether or not the position detection of the workpiece has been successfully performed in the first detection processing (S6). In a case in which the position detection of the workpiece has been successfully performed (YES in S6), the position detection device 100 determines whether or not a current position of the workpiece is within required accuracy (S8). In a case in which the current position of the workpiece is within the requested accuracy (YES in S8), the position detection device 100 outputs a command for controlling the position of the workpiece to the stage 300 (S10). Specifically, the position detection device 100 outputs a command for guiding the workpiece to the successful route and transporting the workpiece to the next process in the production line to the motion controller 200. Thereafter, the position detection device 100 completes the processing.

Meanwhile, in a case in which the current position of the workpiece is not within the required accuracy (NO in S8), the position detection device 100 calculates the amount of control of the stage for correcting the position of the workpiece to the original position (S12). Thereafter, the position detection device 100 outputs a command for controlling the position of the workpiece to the motion controller 200 on the basis of the calculated amount of control of the stage (S14) and returns to the processing in S4. In this manner, the position of the workpiece is corrected to the original position.

In a case in which the position detection device 100 has failed to perform the position detection of the workpiece in the processing in S6 (NO in S6), the position detection device 100 tries second detection processing that is position detection processing performed the second time on the basis of the same image data as the image data used in S4, in accordance with the second detection processing (S16). At this time, the position detection device 100 uses a processing flow that is more robust than the processing flow used in the first detection processing in S4.

For example, algorithms that is more robust may be used in the second detection processing unlike the first detection processing. Parameter setting values that are more robust may be used in the second detection processing unlike the first detection processing. Although the same algorithms and the parameter setting values as those in the first detection processing are used in the second detection processing, the number of times the detection is tried may be larger than that in the first detection processing. In the second detection processing, algorithms that are more robust may be used unlike the first detection processing, and also, the number of times the detection is tried may be larger than that in the first detection processing. In the second detection processing, parameter setting values that are more robust may be used unlike the first detection processing, and also, the number of times the detection is tried may be greater than that in the first detection processing. In this manner, the second detection processing is processing of performing position detection that is more robust by differentiating the content (algorithms and parameter setting values) of the processing flow and the number of times the detection is tried from those in the first detection processing.

The position detection device 100 determines whether or not the position detection of the workpiece has been successfully performed in the second detection processing (S18). In a case in which the position detection of the workpiece has been successfully performed (YES in S18), the position detection device 100 calculates the amount of control of the stage for correcting the position of the workpiece to transport the workpiece from the production line to the outside (S20). Thereafter, the position detection device 100 outputs a command for controlling the position of the workpiece to the motion controller 200 on the basis of the calculated amount of control of the stage (S22). Specifically, the position detection device 100 outputs a command for guiding the workpiece to a failure route to the motion controller 200. Thereafter, the position detection device 100 completes the processing.

Meanwhile, in a case in which the position detection of the workpiece has failed (NO in S18), the position detection device 100 receives a manual input of the position coordinates of the workpiece by the user from the user (precisely, position coordinates of the positioning marks) (S24). Note that a specific method of manually inputting the position coordinates by the user will be described later with reference to FIG. 8.

The position detection device 100 stores the position coordinates manually input by the user in S24 (manually input coordinates) in association with the image data along with the image data when the position detection has failed (S26).

The position detection device 100 determines whether or not a learning start condition has been satisfied (S28). The learning start condition refers to a condition for starting the processing flow decision processing. The processing flow decision processing is processing for deciding, by machine learning, the processing flow that the second detection processing follows, and specific description will be given with reference to FIG. 9.

In the processing flow decision processing, an appropriate processing flow cannot be decided without some sample data. Therefore, it is only necessary for the learning start condition to be satisfied when the number of pairs of image data and manually input coordinates when the position detection has failed exceeds a predetermined number. Note that the learning start condition is not limited to the number of sample data items, and another condition such as an elapsed time, the number of workpieces that have been transported to the production line regardless of whether the position detection has been successively performed or has failed, or the like may be used.

In a case in which the learning start condition has been satisfied (YES in S28), the position detection device 100 executes the processing flow decision processing (S30) and moves on to the processing in and after S20. Meanwhile, in a case in which the learning start condition has not been satisfied (NO in S28), the position detection device 100 moves on to the processing in and after S20 without executing the processing flow decision processing.

In this manner, the position detection device 100 detects the position of the workpiece on the basis of the image data in accordance with the first detection processing (S4), outputs the control command for controlling the position of the workpiece in a case in which the position of the workpiece has been detected (S10), or detects the position of the workpiece on the basis of the image data in accordance with the second detection processing that is more robust than that of the first detection processing in a case in which the position of the workpiece has not been detected (S16), and outputs the control command for controlling the position of the workpiece on the basis of a result of the detection (S22).

In addition, the position detection device 100 outputs the control command for controlling the position of the workpiece to transport the workpiece from the production line to the outside regardless of whether or not the position of the workpiece has been detected in the second detection processing (S22).

G. Screen Display Example when Position Detection has Failed

Figure 8:
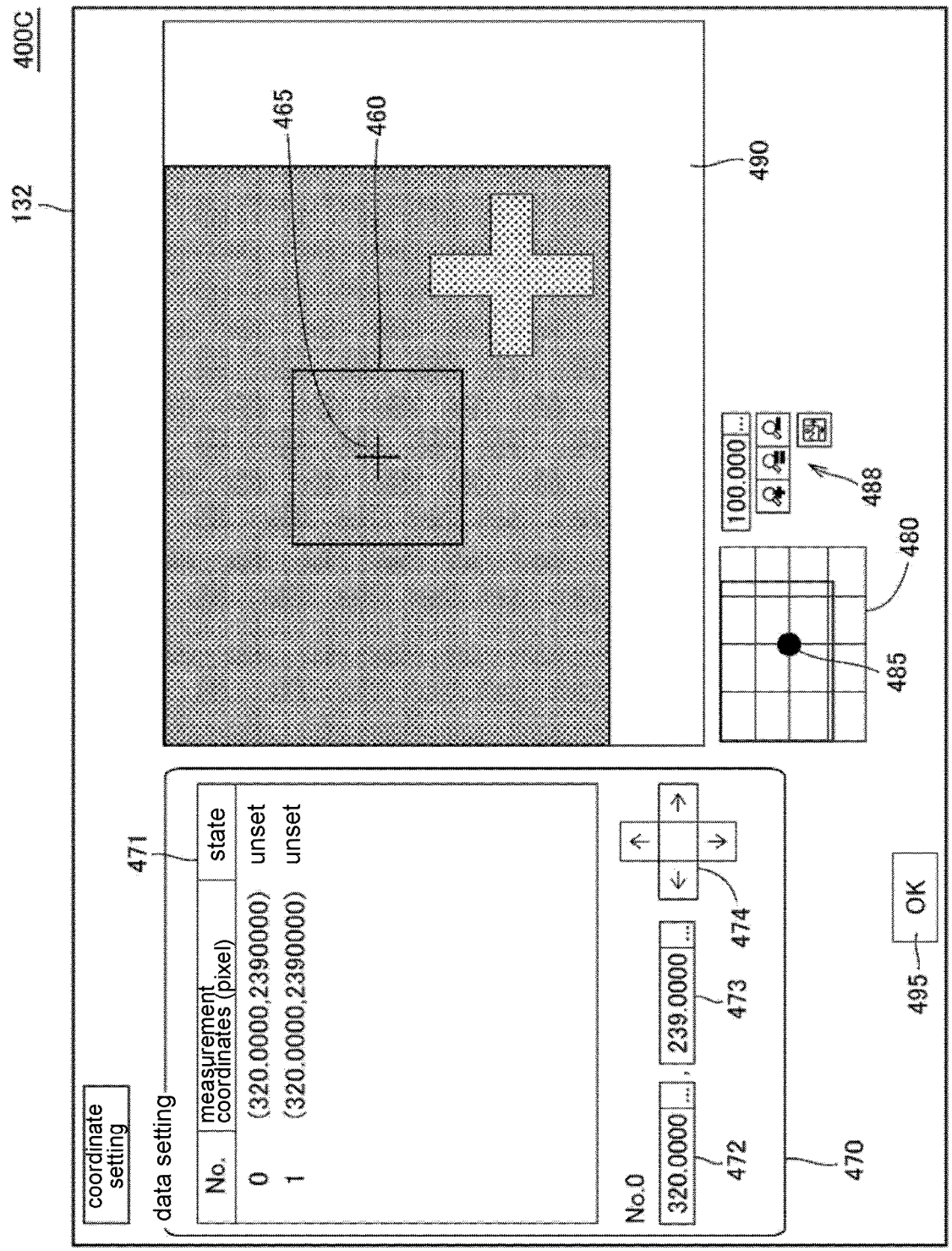
FIG. 8 is a diagram illustrating a screen display example when position detection has failed in the position detection device according to the embodiment.

FIG. 8 is a diagram illustrating a screen display example when the position detection has failed in the position detection device 100 according to the embodiment. As illustrated in FIG. 8, a coordinate setting screen 400C is displayed on the display unit 132 in a case in which the position detection has failed in the second detection processing (in a case of NO in S18 in FIG. 7). Hereinafter, the coordinate setting screen 400C will be described.

The coordinate setting screen 400C includes an image display area 490, a data setting area 470, a coordinate display area 480, and a display control icon group 488.

The image data on which the position detection has been performed is displayed in the image display area 490. Although the positioning marks are represented in the image displayed in the image display area 490, the difference in shading between the positioning marks and the surroundings thereof decreases, and it is difficult to identify the boundaries thereof due to poor printing accuracy. In addition, a cursor 460 including a cross icon 465 is displayed in the image display area 490. The user can move the cursor 460 by selecting a cross button 474, which will be described later, by using the keyboard 134 or the mouse 138 and can set coordinates, at which the center of the cross icon 465 is located, as manually input coordinates.

A data display section 471, an X coordinate value section 472, a Y coordinate value section 473, the cross button 474 are displayed in the data setting area 470. A reference No., measurement coordinates (pixels), and a state are displayed in the data display section 471. An X coordinate value of the coordinates, at which the center of the cross icon 465 is located, is represented in the X coordinate value section 472. A Y coordinate value of the coordinates, at which the center of the cross icon 465 is located, is represented in the Y coordinate value section 473.

The image data acquired by the cameras 102 and 104 are schematically represented, and the X axis and the Y axis for easy understanding of the coordinates are represented, in the coordinate display area 480. If the user moves the cursor 460 by selecting the cross button 474, a pointer 485 moves in the coordinate display area 480 in accordance with the movement. Further, the display range and the display accuracy of the image data displayed in the coordinate display area 480 are changed in accordance with a user's operation (enlargement, size reduction, or the like) performed on the display control icon group 488. The user can more properly decide the position coordinates of the positioning marks by selecting the cross button 474 while checking the position of the pointer 485.

If the user presses an OK button 495, the position coordinates decided by the user are reflected as setting values of the manually input coordinates. In this manner, the user can set the position coordinates while visually checking the image displayed on the coordinate setting screen 400C in a case in which the position detection has failed in the second detection processing.

H. Processing Flow Decision Processing

Figure 9:
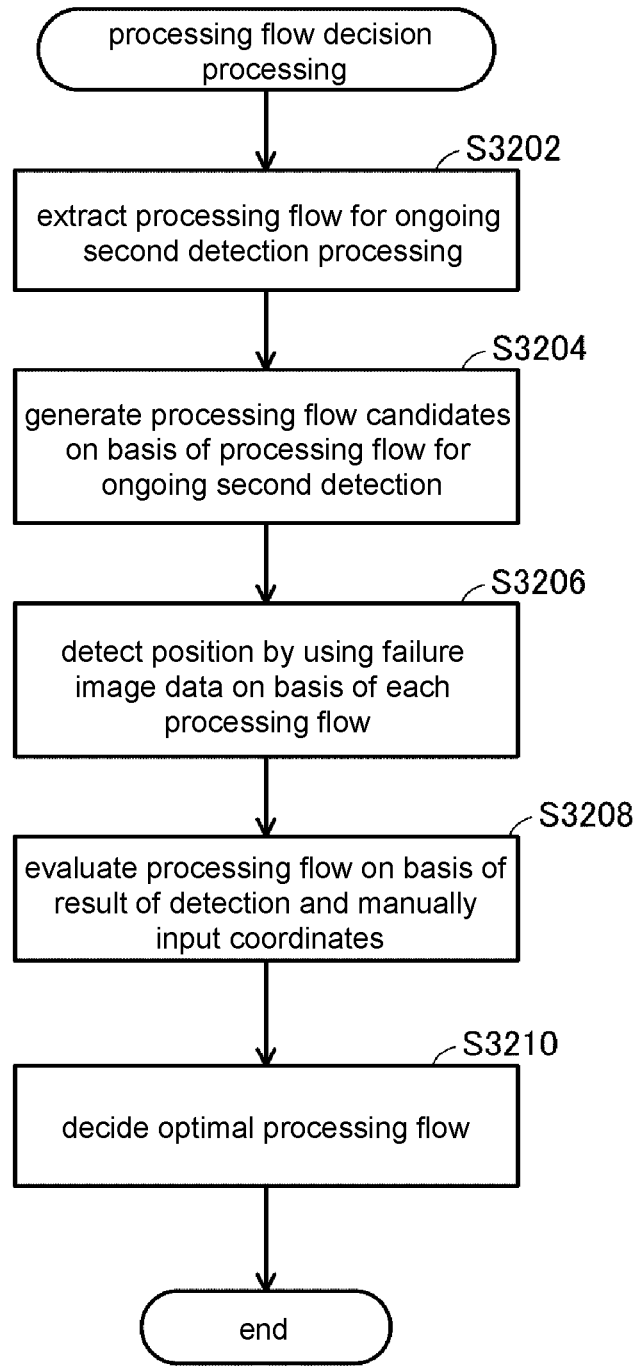
FIG. 9 is a flowchart illustrating processing flow decision processing that the position detection device according to the embodiment executes.

FIG. 9 is a flowchart illustrating processing flow decision processing that the position detection device 100 according to the embodiment executes. Note that the respective steps in the following description will be simply abbreviated as "S".

As illustrated in FIG. 9, the position detection device 100 extracts a processing flow that is used in the ongoing second detection processing (S3202). Specifically, the position detection device 100 extracts a processing flow used in the second detection processing in S16 in FIG. 7.

The position detection device 100 generates processing flow candidates on the basis of the extracted processing flow (S3204). For example, the position detection device 100 generates a plurality of types of processing flow candidates by updating at least either of the algorithms or the parameter setting values with reference to the algorithms and the parameter setting values included in the ongoing processing flow. Note that any method may be used as the method of generating the processing flow candidates. For example, the plurality of types of processing flow candidates may be generated by machine learning on the basis of the number of times the position detection has failed in the second detection processing in the past and the content of the processing flows used at that time.

The position detection device 100 tries to perform the position detection by using the image data when the position detection has failed, which have been accumulated and stored in the processing in S26 in FIG. 7, on the basis of the generated respective processing flows (S3206). At this time, the position detection device 100 may try to perform the position detection by using all the image data items that are accumulated and stored in the past, or the number of image data items may be limited.

The position detection device 100 evaluates whether or not the generated respective processing flows are appropriate on the basis of the result of the detection based on the generated respective processing flows and the manually input coordinates associated and stored with the image data when the position detection has failed (S3208).

The position detection device 100 decides an optimal processing flow from among the generated respective processing flows on the basis of the result of the evaluation obtained in the processing in S3208 and employs the decided processing flow as a processing flow for the following second detection processing (S3210). Thereafter, the position detection device 100 completes the processing. Note that the decision of the optimal processing flow will be described later with reference to FIG. 11.

In this manner, the position detection device 100 decides the optimal processing flow by updating at least either of the algorithms or the parameter setting values that the second detection processing flows on the basis of the stored image data and the position data associated with the image data.

I. Outline of Processing Flow Decision Processing

Figure 10:
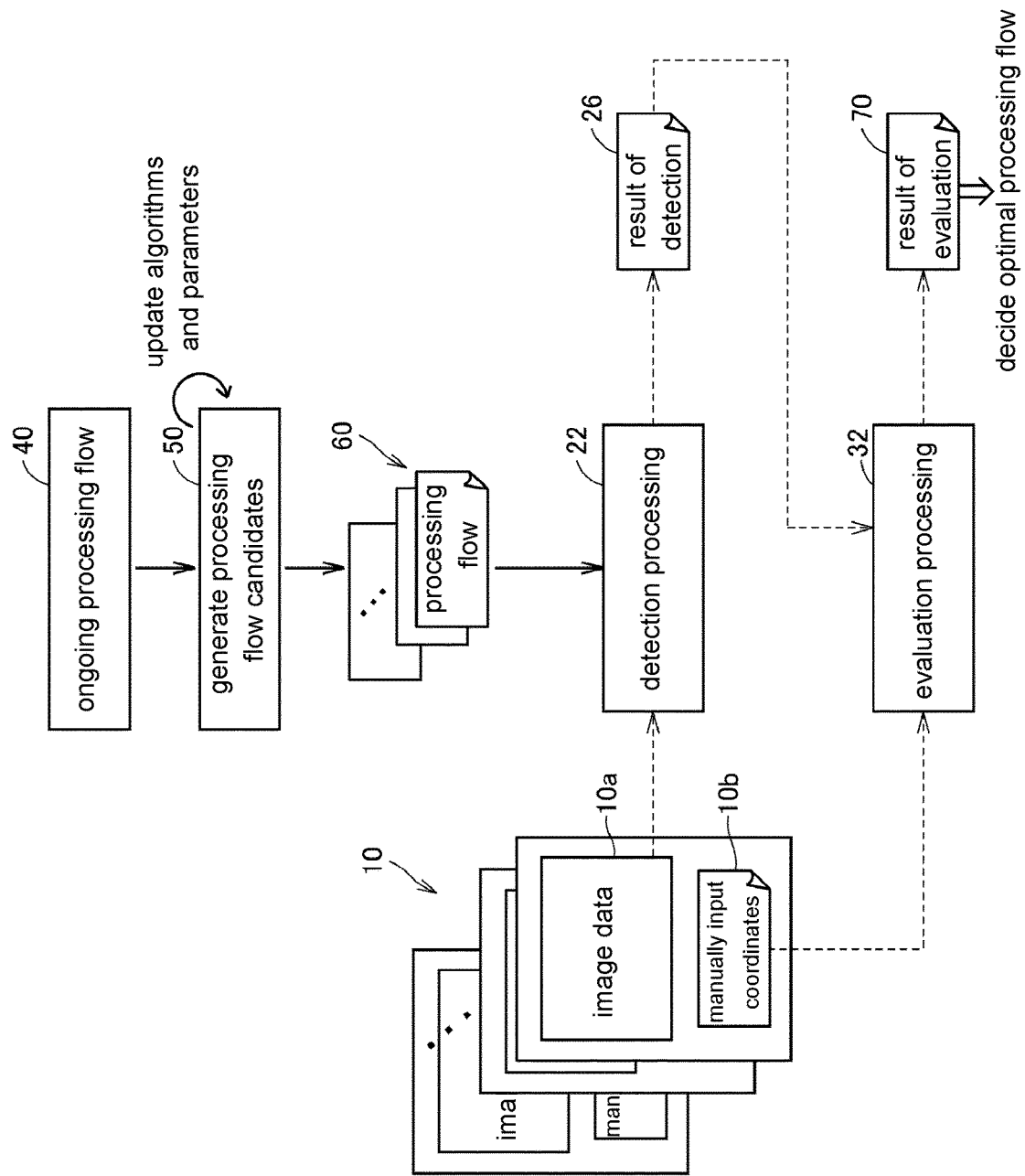
FIG. 10 is a diagram for explaining an outline of processing flow decision processing that the position detection device according to the embodiment executes.

FIG. 10 is a diagram for explaining an outline of processing flow decision processing that the position detection device 100 according to the embodiment executes.

As illustrated in FIG. 10, the position detection device 100 extracts the processing flow that is used in the ongoing second detection processing by an ongoing processing flow application 40. Next, the position detection device 100 generates processing flow candidates 60 on the basis of the extracted processing flow by a processing flow candidate generation application 50. The position detection device 100 tries to perform the position detection by using one image data item 10a in a data group 10 when the position detection has failed, which has been accumulated and stored, on the basis of the generated respective processing flows 60 by a detection processing application 22.

The position detection device 100 evaluates whether or not the generated respective processing flows 60 are appropriate on the basis of a result of detection 26 output by the detection processing application 22 and manually input coordinates 10b corresponding to the image data 10a, for which the position detection is tried, by an evaluation processing application 32.

The position detection device 100 decides an optimal processing flow from among the generated respective processing flows 60 on the basis of a result of evaluation 70 obtained by the evaluation processing application 32.

J. Outline of Evaluation Result

FIG. 11 is a diagram for explaining a result of evaluating the processing flows in the position detection device 100 according to the embodiment.

As illustrated in FIG. 11, the result of the evaluation includes a processing flow including algorithms 1200 and parameter setting values 1300 and a result of the evaluation thereof 1400 to correspond to the generated respective processing flow candidates 1100.

The algorithms 1200 include measurement algorithms 1210 and additional processing 1220. The measurement algorithms 1210 include search detection processing 1211 and edge detection processing 1212. The additional processing 1220 includes filter processing 1221 and size variation processing 1222. The parameter setting values 1300 include a search region 1301. Note that these algorithms 1200 and the parameter setting values 1300 are just examples, and that the results of the evaluation may include other algorithms and parameter setting values.

In this example, six types of candidates are generated as processing flow candidates. For any of the candidates, the search detection processing is set to be effective, and the edge detection processing is set to be ineffective as the measurement algorithms. In addition, for the candidates 1 to 3, neither the filter processing nor the size variation processing are set to be ineffective as the additional processing. For the candidates 4 to 6, the filter processing is set to be ineffective while the size variation processing is set to be effective as the additional processing. In addition, although the search regions are set as the parameter setting values for any of the candidates, the search regions are different between the candidates in accordance with the setting values. For the candidates 1 and 4, for example, the search regions are the broadest in all the candidates. Meanwhile, the search regions are the narrowest in all the candidates for the candidates 3 and 6.

Although the candidates for which the filter processing has been set to effective are more robust than the candidates for which the filter processing has been set to be ineffective, the processing time of the candidates for which the filter processing has been set to effective tend to be longer. In addition, the candidates for which the search regions have been set to be broader are more robust than the candidates for which the search regions have been set to be narrow, the processing time of the candidates for which the search regions have been set to be broader tends to be longer.

The position detection device 100 decides an optimal processing flow from among the listed candidates 1 to 6 on the basis of a predetermined reference for employment if the result of the evaluation as illustrated in FIG. 11 is obtained. The reference for employment can be appropriately set by the user.

For example, the position detection device 100 may decide, as the optimal processing flow, a candidate with the smallest deviation 1401 between the position coordinates detected at the time of the evaluation and the manually input coordinates stored in the past. In a case in which the candidate with the smallest deviation 1401 is selected, a processing flow that is more robust is decided.

In addition, the position detection device 100 may decide, as an optimal processing flow, a candidate with the shortest processing time 1402. In a case in which the candidate with the shortest processing time 1402 is selected, a processing flow with a shorter processing time is decided.

Further, the position detection device 100 may calculate weighted deviation between the position coordinates detected at the time of the evaluation and the deviation from manually input coordinates 1401 stored in the past and the weighted processing time 1402 and decide an optimal processing flow on the basis of the evaluated values. Note that a method of weighting the deviation 1401 and the processing time 1402, the ratio of the weighting, and the like may be able to be set by the user or may be decided by the position detection device 100 through machine learning based on accumulated data. In this manner, an optimal processing flow is decided in consideration of the robustness and the processing time in a case in which the candidates are selected in consideration of both the deviation and the processing time.

K. Specific Examples

FIGS. 12 to 15 are diagrams illustrating examples for explaining differences in robustness between the first detection processing and the second detection processing in the position detection device 100 according to the embodiment.

FIG. 12 illustrates an example of a case in which the algorithms are the same and the parameter setting values are different in the first detection processing and the second detection processing. Specifically, the search detection processing is used while the addition processing is set to be ineffective as the algorithms in both the first detection processing and the second detection processing. However, a part of the search region is set in the first detection processing while the entire search region is set in the second detection processing.

(A-1) of (A) of FIG. 12 shows "position has been successfully detected", (A-2) of (A) of FIG. 12 shows "position detection has been failed", (B-1) of (B) of FIG. 12 shows "position has been successfully detected", and (B-2) of (B) of FIG. 12 shows "position has been successfully detected". Note that the position detection is performed on the same normal image data (hereinafter, also referred to as normal state image data) in the examples respectively illustrated in (A-1) of (A) of FIG. 12 and (B-1) of (B) of FIG. 12. For example, the image data at the normal state is image data obtained by imaging the workpiece, the positioning marks on which have been printed normally, which is arranged at a normal position on the stage. Meanwhile, the position detection is performed on image data that is not normal (hereinafter, also referred to as abnormal state image data) in both the examples respectively illustrated in (A-2) of (A) of FIG. 12 and (B-2) of (B) of FIG. 12. The abnormal state image data in this example is image data of the workpiece, on which the positioning marks have been printed normally, which are arranged at apposition that is not normal on the stage (the positions deviated to the upper left side from the normal positions in this example).

If the first detection processing is performed on the normal state image data as illustrated in (A-1) of (A) of FIG. 12, the positioning marks are accommodated in the search region 500, and the position detection device 100 can thus detect the positioning marks. Meanwhile, if the second detection processing is performed on the normal state image data as illustrated in (B-1) of (B) of FIG. 12, the positioning marks are accommodated in the search region 500 in a manner similar to that in the first detection processing, the position detection device 100 can thus detect the positioning marks.

If the first detection processing is performed on the abnormal state image data as illustrated in (A-2) of (A) of FIG. 12, the positioning marks are not accommodated in the search region 500, and thus, the position detection device 100 cannot detect the positioning marks. Meanwhile, the second detection processing is performed on the abnormal state image data as illustrated in (B-2) of (B) of FIG. 12, the positioning marks are accommodated in the search region 500, and the position detection device 100 can thus detect the positioning marks. However, it takes a longer processing time for the second detection processing since the amount of processing at the time of the position detection increases as compared with the first detection processing by the amount by which the wide search region 500 is wide.

FIG. 13 illustrates an example of a case in which the algorithms are different and the parameter setting values are the same in the first detection processing and the second detection processing. Specifically, although the search detection processing is used as algorithms in both the first detection processing and the second detection processing, the filter processing is set to be ineffective for the first detection processing while the filter processing is set to be effective for the second detection processing as the additional processing.

(A-1) of (A) of FIG. 13 shows "position has been successfully detected", (A-2) of (A) of FIG. 13 shows "position detection has been failed", (B-1) of (B) of FIG. 13 shows "position has been successfully detected", and (B-2) of (B) of FIG. 13 shows "position has been successfully detected". Note that the position detection is performed on the same normal state image data in examples respectively illustrated in (A-1) of (A) of FIG. 13 and (B-1) of (B) of FIG. 13. Meanwhile, the position detection is performed on the abnormal state image data in both the examples respectively illustrated in (A-2) of (A) of FIG. 13 and (B-2) of (B) of FIG. 13. The abnormal state image data in the example is image data of the workpiece, for which it becomes difficult to identify the boundaries between the positioning marks and the surroundings thereof.

If the first detection processing is performed on the normal state image data as illustrated in (A-1) of (A) of FIG. 13, the positioning marks are clear, and the position detection device 100 can thus detect the positioning marks. Meanwhile, if the second detection processing is performed on the normal state image data as illustrated in (B-1) of (B) of FIG. 13, the positioning marks are clear in a manner similar to those in the first detection processing, the position detection device 100 can thus detect the positioning marks.

If the first detection processing is performed on the abnormal state image data as illustrated in (A-2) of (A) of FIG. 13, the positioning marks are not clear, and thus, the position detection device 100 cannot detect the positioning marks. Meanwhile, if the second detection processing is performed on the abnormal state image data as illustrated in (B-2) of (B) of FIG. 13, the positioning marks become clear by the filter processing, the position detection device 100 can thus detect the positioning marks. However, it takes a longer processing time for the second detection processing since the amount of processing at the time of the image detection increases as compared with the first detection processing by the amount corresponding to the execution of the filter processing.

FIG. 14 illustrates an example of a case in which algorithms are different and parameter setting values are the same in the first detection processing and the second detection processing. Specifically, although the search detection processing is used as the algorithms in both the first detection processing and the second detection processing, and the size variation processing is set to be ineffective for the first detection processing while the size variation processing is set to be effective for the second detection processing as the additional processing.

(A-1) of (A) of FIG. 14 shows "position has been successfully detected", (A-2) of (A) of FIG. 14 shows "position detection has been failed", (B-1) of (B) of FIG. 14 shows "position has been successfully detected", and (B-2) of (B) of FIG. 14 shows "position has been successfully detected". The position detection is performed on the same normal state image data in both the examples respectively illustrated in (A-1) of (A) of FIG. 14 and (B-1) of (B) of FIG. 14. Meanwhile, the position detection is performed on the abnormal state image data in both the example respectively illustrated in (A-2) of (A) of FIG. 14 and (B-2) of (B) of FIG. 14. The abnormal state image data in this example is image data of the workpiece for which the positioning marks have been printed to be larger than the original sizes.

If the first detection processing is performed on the normal state image data as illustrated in (A-1) of (A) of FIG. 14, the positioning marks are printed to have the original sizes, and the position detection device 100 can thus detect the positioning marks. Meanwhile, if the second detection processing is performed on the normal state image data as illustrated in (B-1) of (B) of FIG. 14, the positioning marks are printed to have the original sizes in a manner similar to that in the first detection processing, the position detection device 100 can thus detect the positioning marks.

If the first detection processing is performed on the abnormal state image data as illustrated in (A-2) of (A) of FIG. 14, the positioning marks are printed to be larger than the original sizes, and thus, the position detection device 100 cannot detect the positioning marks. Meanwhile, if the second detection processing is performed on the abnormal state image data as illustrated in (B-2) of (B) of FIG. 14, the search detection processing is performed on the basis of a plurality of model images generated in accordance with the sizes of the positioning marks by the size variation processing, and the position detection device 100 can thus detect the positioning marks. However, it takes a longer processing time for the second detection processing since the amount of processing at the time of the position detection increases as compared with the first detection processing by the amount corresponding to the execution of the size variation processing.

FIG. 15 illustrates an example of a case in which algorithms are different and parameter setting values are also different in the first detection processing and the second detection processing. Specifically, the edge detection processing is used for the first detection processing while the search detection processing is used for the second detection processing as the measurement algorithms. In addition, parameters for edge detection processing are used for the first detection processing while parameters for search detection processing are used for the second detection processing as the parameter setting values. For example, an edge region used in the first detection processing is partially set while the search region used in the second detection processing is entirely set.

(A-1) of (A) of FIG. 15 shows "position has been successfully detected", (A-2) of (A) of FIG. 15 shows "position detection has been failed", (B-1) of (B) of FIG. 15 shows "position has been successfully detected", and (B-2) of (B) of FIG. 15 shows "position has been successfully detected". Note that the position detection is performed on the same normal state image data in both the examples respectively illustrated in (A-1) of (A) of FIG. 15 and (B-1) of (B) of FIG. 15. Meanwhile, the position detection is performed on abnormal state image data in both the examples respectively illustrated in (A-2) of (A) of FIG. 15 and (B-2) of (B) of FIG. 15. The abnormal state image data in this example is image data of the workpiece that are arranged on positions that are not normal on the stage (positions deviated to the upper left side from the normal positions in this example) although the positioning marks (circles in this example) are printed normally.

If the first detection processing is performed on the normal state image data as illustrated in (A-1) of (A) of FIG. 15, the positioning marks are accommodated in the edge region 600, and the position detection device 100 can thus detect the positioning marks. Meanwhile, if the second detection processing is performed on the normal state image data as illustrated in (B-1) of (B) of FIG. 15, the positioning marks are accommodated in the search region 500, and the position detection device 100 can thus detect the positioning marks.

If the first detection processing is performed on the abnormal state image data as illustrated in (A-2) of (A) of FIG. 15, the positioning marks are not accommodated in the edge region 600, and thus, the position detection device 100 cannot detect the positioning marks. Meanwhile, if the second detection processing is performed on the abnormal state image data as illustrated in (B-2) of (B) of FIG. 15, the positioning marks are accommodated in the search region 500, the position detection device 100 can thus detect the positioning marks. However, the processing amount of the search detection processing used in the second detection processing is greater than that of the edge detection processing used in the first detection processing, and the scanning region in the second detection processing is wider. Therefore, it takes a longer processing time for the second detection processing than that for the first detection processing.

In this manner, the second detection processing is processing that requires a larger amount of processing and a longer processing time while being more robust than the first detection processing.

As described above, in a case in which the position of the workpiece cannot be detected on the basis of the image data in accordance with the first detection processing, the position detection device 100 detects the position of the workpiece on the basis of the same image data in accordance with the second detection processing that is more robust than the first detection processing. Then, in a case in which the position of the workpiece can be detected in the second detection processing, the position detection device 100 calculates the amount of control of the stage 300 by using the detected position coordinates and outputs a command for controlling the position of the workpiece to the motion controller 200 on the basis of the calculated amount of control of the stage. In this manner, it is possible to reduce a frequency at which the user visually checks the position and manually inputs the position coordinates and thereby to prevent productivity from being degraded to the maximum extent even in a case in which the position of the workpiece has not been detected.

In addition, in a case in which the position of the workpiece cannot be detected on the basis of the image data in accordance with the second detection processing, the position detection device 100 receives the manual input of the user and associates and stores the manually input coordinates obtained by the reception with the image data. Then, if the number of pairs of the accumulated and stored image data and the manually input coordinates exceeds a predetermined number, the position detection device 100 decides an optimal processing flow for the second detection processing in consideration of the robustness and the processing time, by the processing flow decision processing. The position detection device 100 can execute the second detection processing by using the decided optimal processing flow from the next time.

L. Modification Examples

In the position control system 1 according to the embodiment, the position detection device 100 outputs the command for controlling the position of the workpiece to transport the workpiece from the production line to the outside to the motion controller 200 (S22) regardless of whether or not the position of the workpiece has been detected in the second detection processing (regardless of the result of S18) as illustrated in FIG. 7. However, the position detection device 100 may execute the processing as illustrated in FIG. 16.

Figure 16:
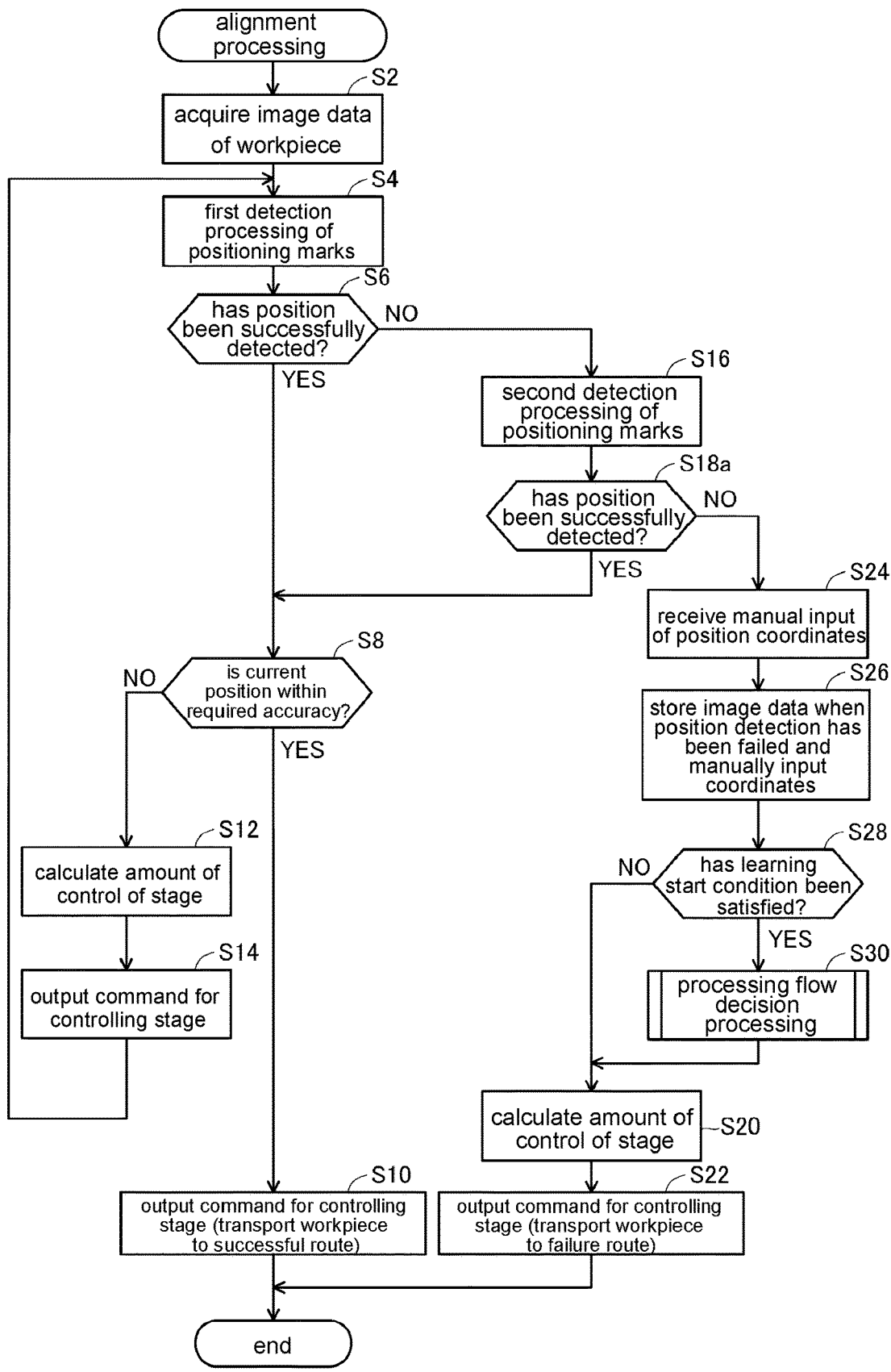
FIG. 16 is a flowchart illustrating alignment processing that a position detection device according to a modification example of the embodiment executes.

FIG. 16 is a flowchart illustrating alignment processing that the position detection device 100 according to a modification example of the embodiment executes. Specifically, the position detection device 100 may move on to the processing in S8 to pass through the same flow as that employed when the position of the workpiece has been detected in the first detection processing (YES in S6) in a case in which the position of the workpiece has been detected in the second detection processing (YES in S18a). For example, the abnormal state image data illustrated in FIGS. 12 and 15 is just arranged at a position that is not normal on the stage, and the positioning marks are printed normally on the workpiece itself. Therefore, as illustrated in FIG. 16, it is possible to improve a yield by moving on to a flow for transporting the workpiece to the next process of the production line in a case in which the position of the workpiece has been detected in the second detection processing that is more robust than the first detection processing.

In the position control system 1 according to the embodiment, the position detection device 100 executes the position detection of the workpiece, further calculates the amount of control of the stage 300, and outputs a command for controlling the stage 300. However, the position control system 1 may include a device that has other functions in addition to the functions that the position detection device 100 has. In addition, the position detection device 100 may have only the function of detecting the position of the workpiece, and a device separate from the position detection device 100 or the motion controller 200 may have the function of calculating the amount of control of the stage 300 and the function of outputting the command for controlling the stage 300 in the position control system 1.

Although the position detection device 100 accumulates and stores only the image data, for which the position detection has failed, in the processing in S26 of FIG. 7 in the position control system 1 according to the embodiment, the position detection device 100 is not limited thereto. For example, the position detection device 100 may also associate and accumulate not only the image data, for which the position detection has failed, but also image data, for which the position detection has been successfully performed, in the processing in S18 with the detected position coordinates. In addition, an optimal processing flow may be decided on the basis not only of the image data, for which the position detection has failed, but also of the image data, for which the position detection has been successfully performed, in the processing flow decision processing.

M. Advantages

According to the position control system 1 and the position detection device 100 of the embodiment, it is possible to reduce the frequency at which the user visually checks the position and manually inputs the position coordinates even in a case in which the position of the workpiece has not been detected, and thereby to prevent productivity from being degraded to the maximum extent.

In an exemplary embodiment, algorithms that the second detection processing follows are different from algorithms that the first detection processing follows.

In an exemplary embodiment, parameter setting values that the second detection processing follows are different from parameter setting values that the first detection processing follows.

In an exemplary embodiment, a number of times of position detection of the object by the second detection processing is greater than a number of times of position detection of the object by the first detection processing.

In an exemplary embodiment, the position detection device further includes: a reception portion that receives position data with which the position of the object can be specified in a case in which the second detection portion has not detected the position of the object.

In an exemplary embodiment, the position detection device further includes: a storage portion that stores the position data to correspond to the image data along with the image data; and an update portion that updates at least either of the algorithms or the parameter setting values that the second detection processing follows, on the basis of the image data and the position data stored in the storage portion In an exemplary embodiment, the second control command is a command for controlling the position of the object to transport the object from a production line to the outside. The second output portion outputs the second control command regardless of whether or not the second detection portion has detected the position of the object.

In an exemplary embodiment, the first control command is a command for controlling the position of the object to transport the object to a next process on the production line. The second control command is a command for controlling the position of the object to transport the object from the production line to the outside. The second output portion outputs the first control command in a case in which the second detection portion has detected the position of the object, and outputs the second control command in a case in which the second detection portion has not detected the position of the object.

According to still another aspect of the disclosure, there is provided a non-transitory recording medium, wherein a control program is installed in the non-transitory recording medium and realizes, by being executed by a computer, a position detection device that detects a position of an object that is moved by a moving mechanism. The control program causes the computer to execute: an acquiring step of acquiring image data that is obtained by imaging the object; a first detection step of detecting the position of the object on the basis of the image data in accordance with a first detection processing; a first output step of outputting a first control command for controlling the position of the object in a case in which the position of the object has been detected in the first detection step; a second detection step of detecting the position of the object on the basis of the image data in accordance with a second detection processing that is more robust than the first detection processing in a case in which the position of the object has not been detected in the first detection step; and a second output step of outputting a second control command for controlling the position of the object on the basis of a detection result in the second detection step.

According to the one or more exemplary embodiments, it is possible to prevent productivity from being degraded to the maximum extent in a case in which a position of an object has not been detected.

It should be considered that the embodiments disclosed herein are only for the illustrative purpose in terms of any points and are not restrictive. The scope of the disclosure is represented by the claims rather than the above description and is intended to include all modifications within meanings and a range equivalent to the claims.

What is claimed is:

1. A position control system that controls a position of an object that is moved by a moving mechanism, the position control system comprising:
    a motion controller that controls the moving mechanism;
    an image capturing device that acquires image data that is obtained by imaging the object; and
    a processor configured to function as:
    a first detection portion that detects the position of the object on the basis of the image data in accordance with a first detection processing;
    a first output portion that outputs a first control command for controlling the position of the object to the motion controller in a case in which the first detection portion has detected the position of the object;
    a second detection portion that detects the position of the object on the basis of the image data in accordance with a second detection processing that is more robust than the first detection processing in a case in which the first detection portion has not detected the position of the object; and
    a second output portion that outputs a second control command for controlling the position of the object to the motion controller on the basis of a detection result performed by the second detection portion,
    wherein the second control command is a command for controlling the position of the object to transport the object from a production line to an outside by a transport path, wherein a width of the transport path is fixed and when the object is transported via the transport path the position of the object is corrected to be accommodated in the transport path.

2. A position detection device that detects a position of an object that is moved by a moving mechanism, the position detection device comprising:
    an image capturing device that acquires image data that is obtained by imaging the object;
    a processor configured to function as:
    a first detection portion that detects the position of the object on the basis of the image data in accordance with a first detection processing;
    a first output portion that outputs a first control command for controlling the position of the object in a case in which the first detection portion has detected the position of the object;
    a second detection portion that detects the position of the object on the basis of the image data in accordance with second detection processing that is more robust than the first detection processing in a case in which the first detection portion has not detected the position of the object; and
    a second output portion that outputs a second control command for controlling the position of the object on the basis of a detection result performed by the second detection portion,
    wherein the second control command is a command for controlling the position of the object to transport the object from a production line to an outside by a transport path, wherein a width of the transport path is fixed and when the object is transported via the transport path the position of the object is corrected to be accommodated in the transport path.

3. The position detection device according to claim 2, wherein algorithms that the second detection processing follows are different from algorithms that the first detection processing follows.

4. The position detection device according to claim 2, wherein parameter setting values that the second detection processing follows are different from parameter setting values that the first detection processing follows.

5. The position detection device according to claim 2, wherein a number of times of position detection of the object by the second detection processing is greater than a number of times of position detection of the object by the first detection processing.

6. The position detection device according to claim 2, wherein the processor is further configured to function as:
    a reception portion that receives position data with which the position of the object can be specified in a case in which the second detection portion has not detected the position of the object.

7. The position detection device according to claim 6, wherein the processor is further configured to function as:
    a storage portion that stores the position data to correspond to the image data along with the image data; and
    an update portion that updates at least either of algorithms or parameter setting values that the second detection processing follows, on the basis of the image data and the position data stored in the storage portion.

8. The position detection device according to claim 2, wherein the second output portion outputs the second control command regardless of whether or not the second detection portion has detected the position of the object.

9. The position detection device according to claim 2, wherein the first control command is a command for controlling the position of the object to transport the object to a next process on the production line,
    the second output portion
    outputs the first control command in a case in which the second detection portion has detected the position of the object, and
    outputs the second control command in a case in which the second detection portion has not detected the position of the object.

10. The position detection device according to claim 3, wherein parameter setting values that the second detection processing follows are different from parameter setting values that the first detection processing follows.

11. The position detection device according to claim 3, wherein a number of times of position detection of the object by the second detection processing is greater than a number of times of position detection of the object by the first detection processing.

12. The position detection device according to claim 4, wherein a number of times of position detection of the object by the second detection processing is greater than a number of times of position detection of the object by the first detection processing.

13. The position detection device according to claim 10, wherein a number of times of position detection of the object by the second detection processing is greater than a number of times of position detection of the object by the first detection processing.

14. The position detection device according to claim 3, wherein the processor is further configured to function as:
a reception portion that receives position data with which the position of the object can be specified in a case in which the second detection portion has not detected the position of the object.

15. The position detection device according to claim 4, wherein the processor is further configured to function as:
a reception portion that receives position data with which the position of the object can be specified in a case in which the second detection portion has not detected the position of the object.

16. The position detection device according to claim 5, wherein the processor is further configured to function as:
a reception portion that receives position data with which the position of the object can be specified in a case in which the second detection portion has not detected the position of the object.

17. A non-transitory recording medium, wherein a control program is installed in the non-transitory recording medium and realizes, by being executed by a computer, a position detection device that detects a position of an object that is moved by a moving mechanism, the control program causing the computer to execute:
an acquiring step of acquiring image data that is obtained by imaging the object;
a first detection step of detecting the position of the object on the basis of the image data in accordance with a first detection processing;
a first output step of outputting a first control command for controlling the position of the object in a case in which the position of the object has been detected in the first detection step;
a second detection step of detecting the position of the object on the basis of the image data in accordance with a second detection processing that is more robust than the first detection processing in a case in which the position of the object has not been detected in the first detection step; and
a second output step of outputting a second control command for controlling the position of the object on the basis of a detection result in the second detection step,
wherein the second control command is a command for controlling the position of the object to transport the object from a production line to an outside by a transport path, and a width of the transport path is fixed and when the object is transported via the transport path the position of the object is corrected to be accommodated in the transport path.

* * * * *